April 5, 1949.  E. P. BULLARD III, ET AL  2,466,574
TRANSMISSION
Filed April 10, 1941  9 Sheets-Sheet 5
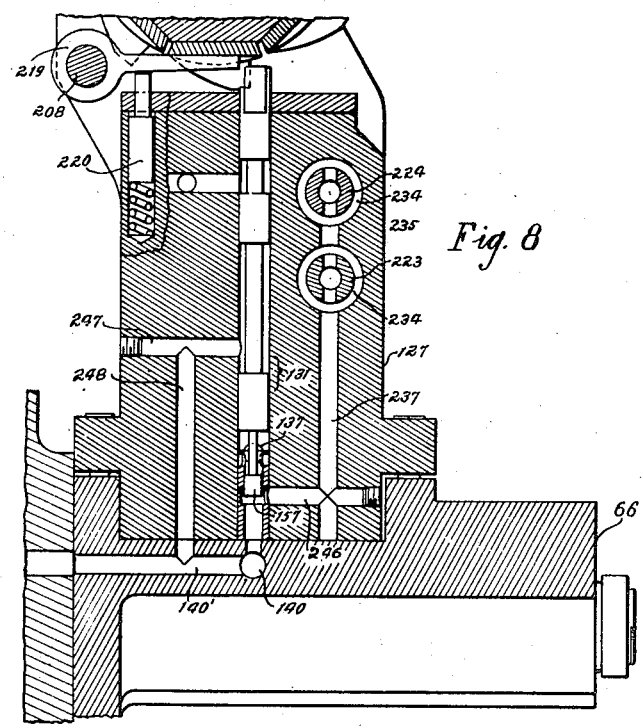
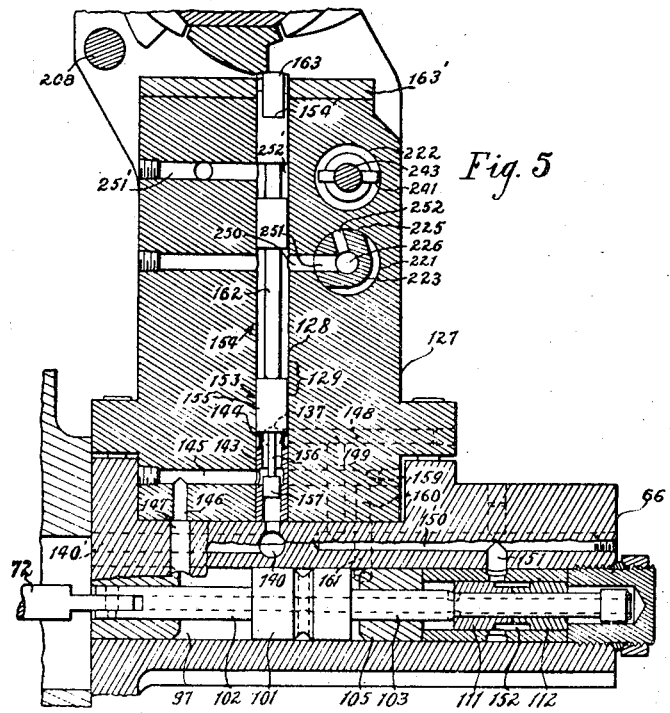
INVENTORS
Edward P. Bullard, III
Edward N. Cowell
BY
Paul M. Gast
ATTORNEY April 5, 1949. E. P. BULLARD III, ET AL 2,466,574
TRANSMISSION Filed April 10, 1941 9 Sheets-Sheet 7

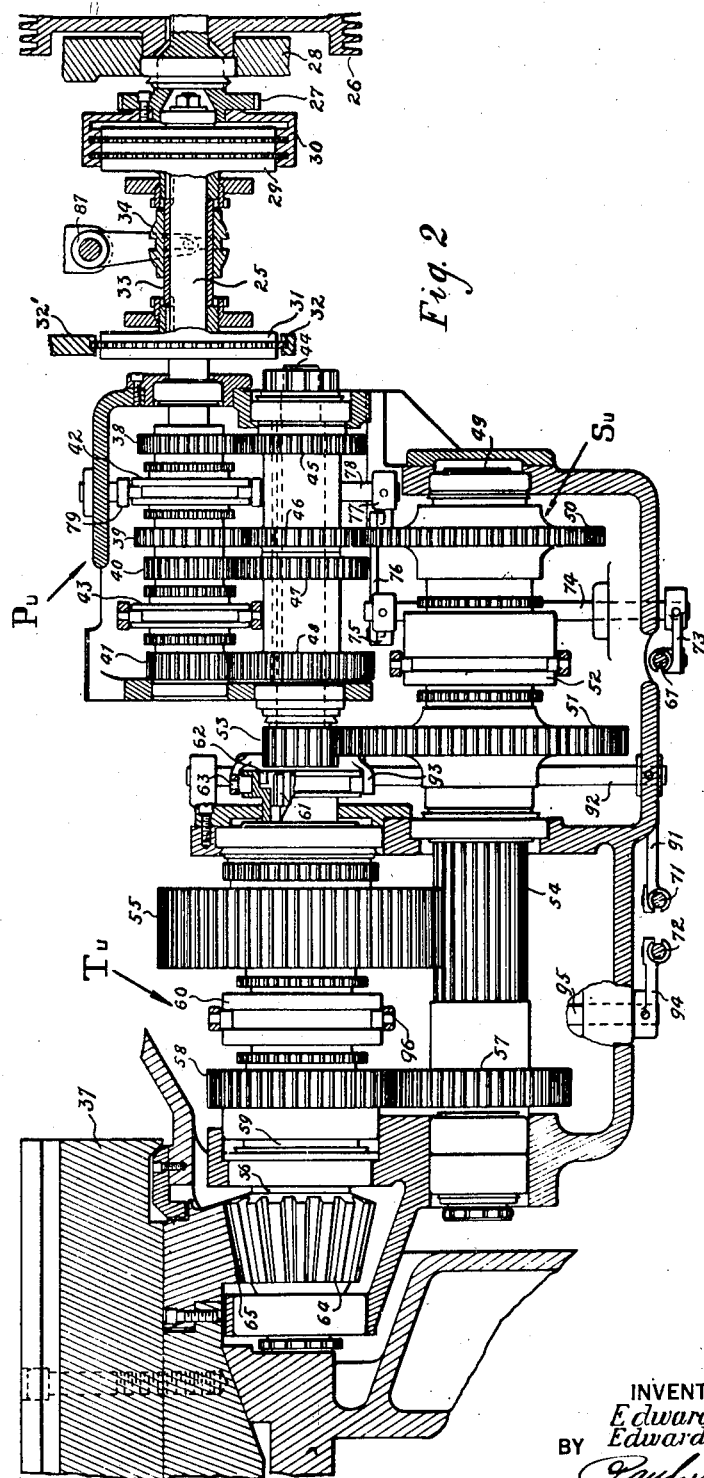

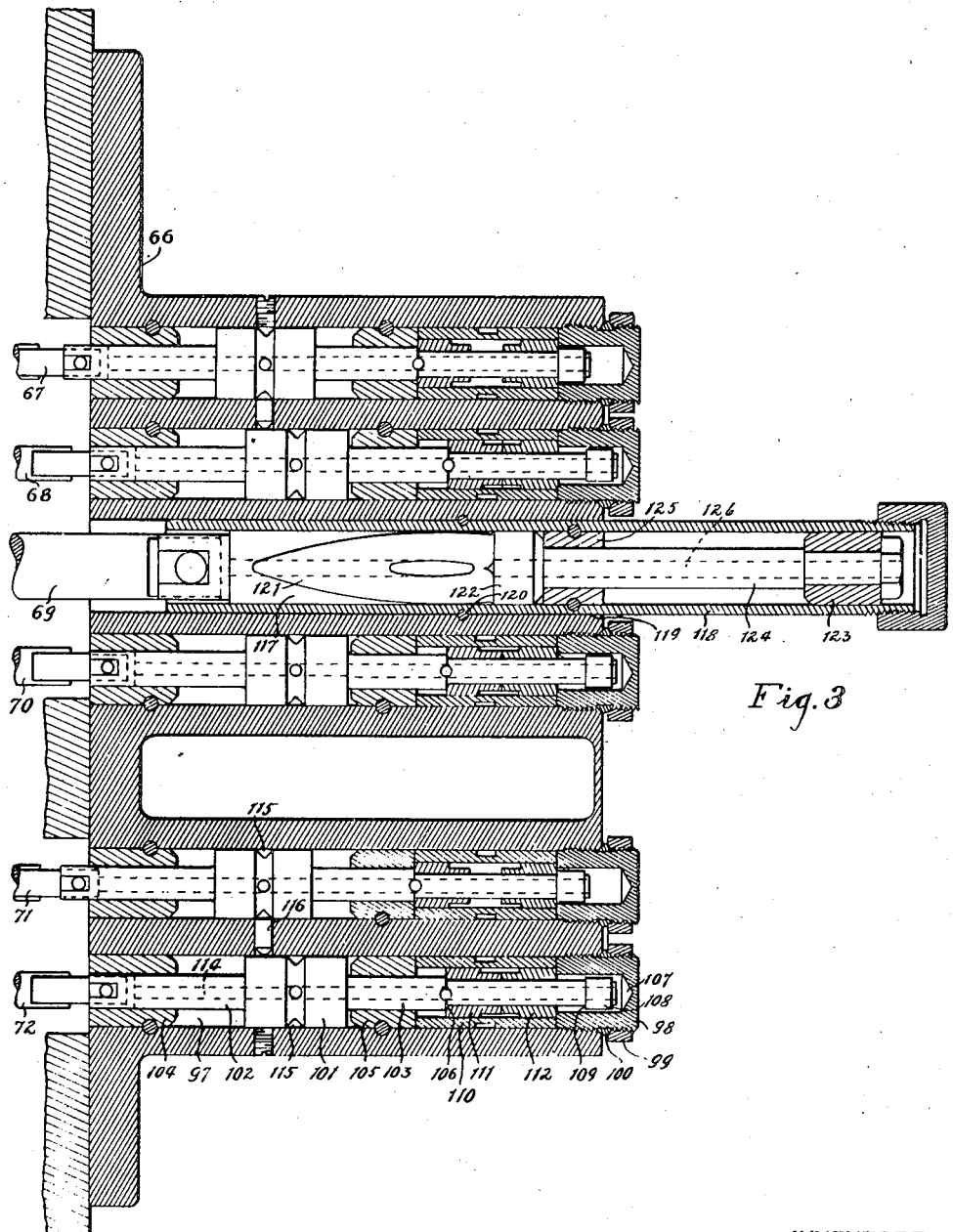

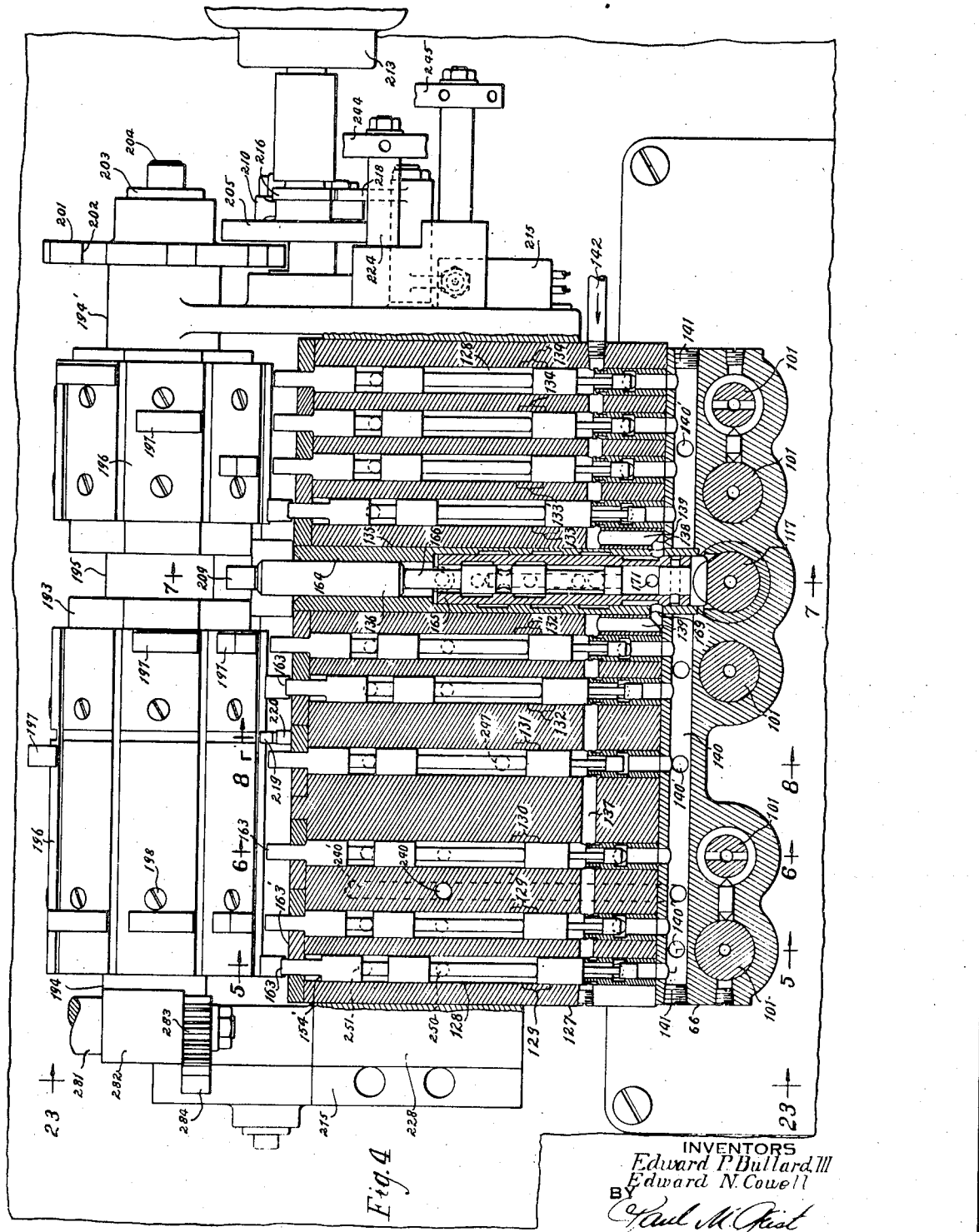

INVENTORS
Edward P. Bullard, III
Edward N. Cowell
BY
Paul M. Geist
ATTORNEY

April 5, 1949.  E. P. BULLARD III, ET AL  2,466,574
TRANSMISSION
Filed April 10, 1941  9 Sheets-Sheet 8
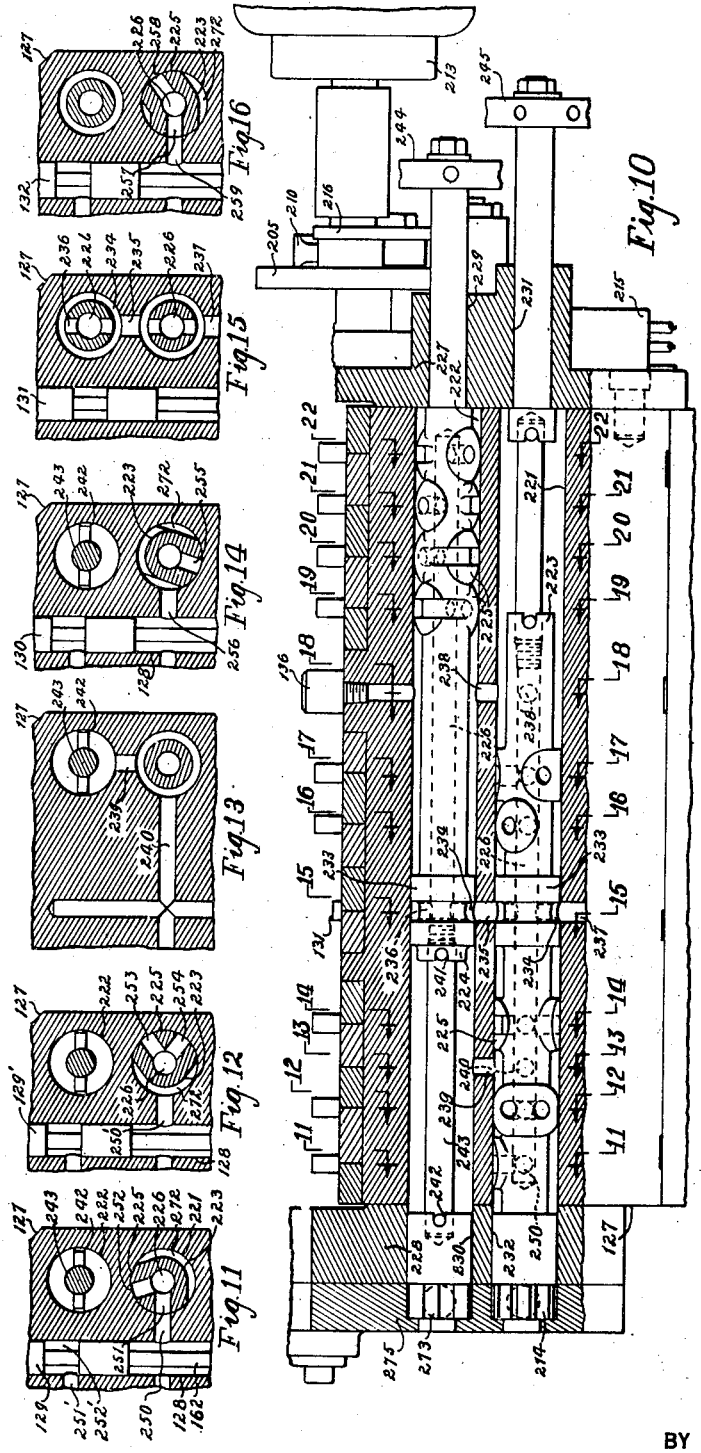
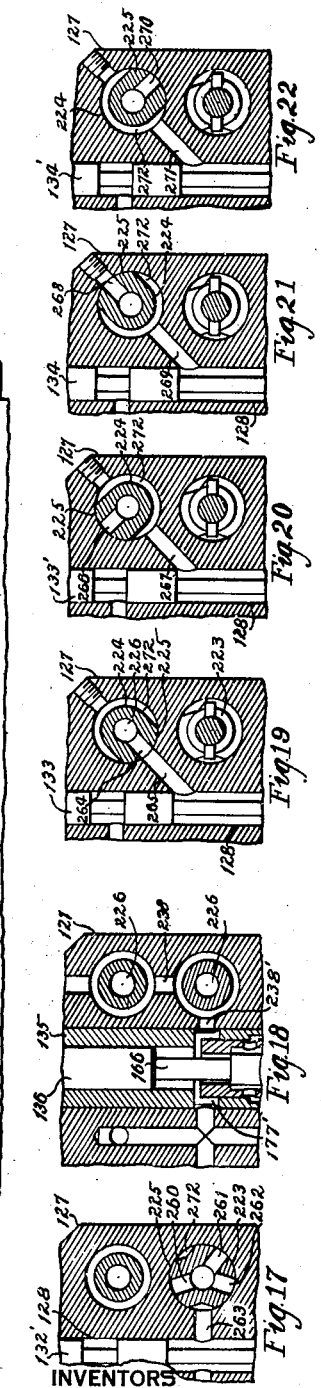
INVENTORS
Edward P. Bullard III
Edward N. Cowell
BY
ATTORNEY April 5, 1949. E. P. BULLARD III, ET AL 2,466,574
TRANSMISSION
Filed April 10, 1941 9 Sheets-Sheet 9
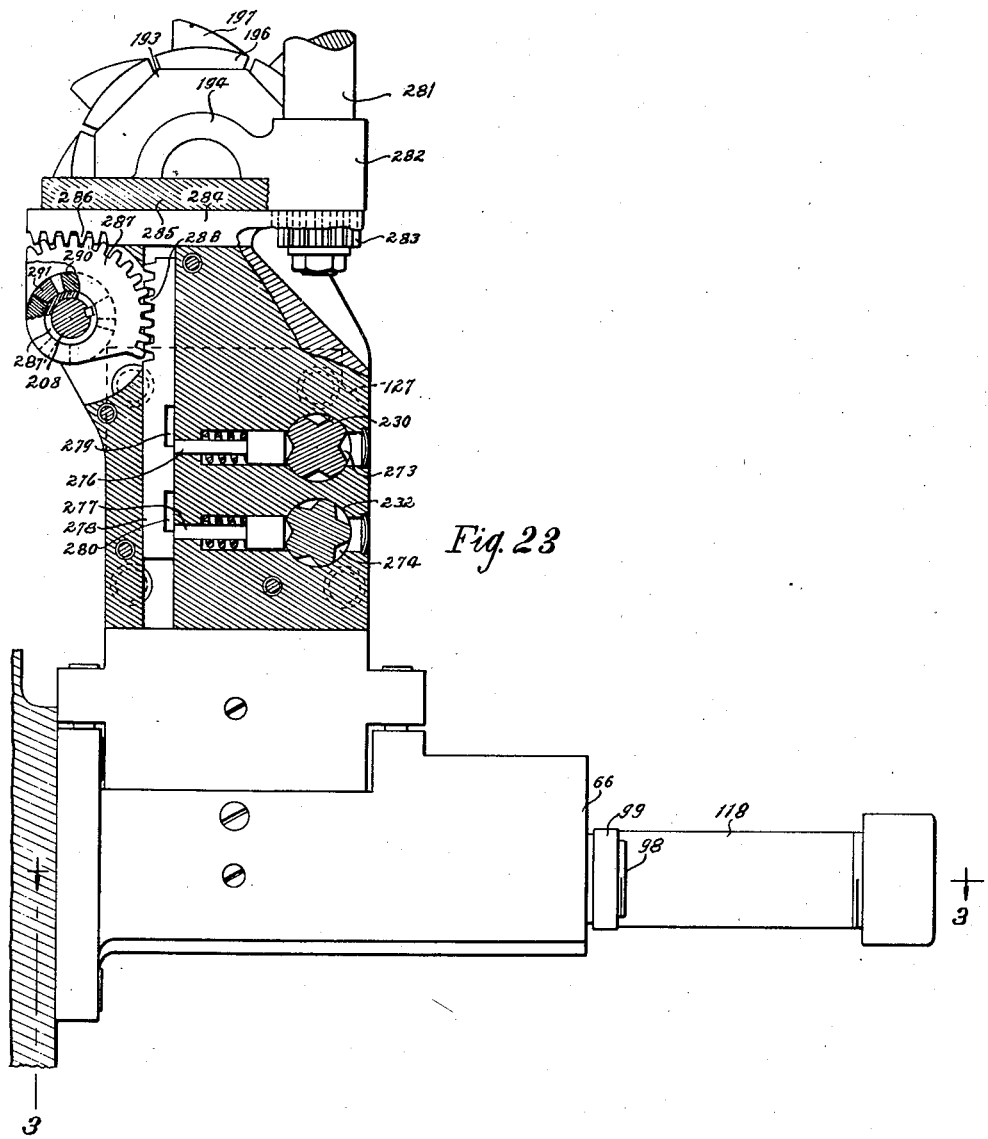
INVENTORS
Edward P. Bullard, III
Edward N. Cowell
BY
Paul M. Grist
ATTORNEY Patented Apr. 5, 1949

2,466,574

UNITED STATES PATENT OFFICE 2,466,574

TRANSMISSION

Edward P. Bullard, III, Fairfield, and Edward N. Cowell, Stratford, Conn., assignors to The Bullard Company, a corporation of Connecticut Application April 10, 1941, Serial No. 387,888

24 Claims. (Cl. 192—4)

This invention relates to transmissions, and particularly to a combined power, and manually-operable control for a transmission.

Among the objects of this invention include the provision of a transmission having means adapted to be operated for establishing various gear combinations, and a power-operated control adapted to perform successive cycles of operation, in each cycle of which any of the means for establishing the various gear combinations may be operated; the provision of such a transmission and control, the cycle of operation of the latter of which includes successively performing certain steps in a definitely timed relation; the provision of such a transmission and control in which the latter, during each cycle of operation, successively neutralizes a main clutch and applies a brake, operates any of the gear-combination establishing means at a time substantially after the engagement of the brake, and disengages the brake and applies the clutch; the provision of such a transmission and control in which any of the means for establishing the various gear combinations may be operated manually without disturbing the setting of the control; and the provision of a transmission including a manually-operable fluid-actuated clutch, the movement of which is definitely proportional to that of the manually-operable means therefor.

The above, other objects and novel features of the invention will become apparent upon considering the following specification and accompanying drawings, in which:

Fig. 2 is a sectional elevational view taken substantially along the line 2—2 of Fig. 1;

Fig. 3 is a sectional view taken substantially along line 3—3 of Fig. 23 showing a portion of the control mechanism of Fig. 1;

Fig. 4 is an elevational view, partly in section, taken substantially along line 4—4 of Fig. 1;

Fig. 5 is a sectional elevational view taken substantially along line 5—5 of Fig. 4;

Fig. 8 is a sectional elevational view taken substantially along line 8—8 of Fig. 4;

Fig. 10 is a sectional elevational view taken substantially along line 10—10 of Fig. 9, and showing the apparatus in position for manual manipulation;

Figure 1:
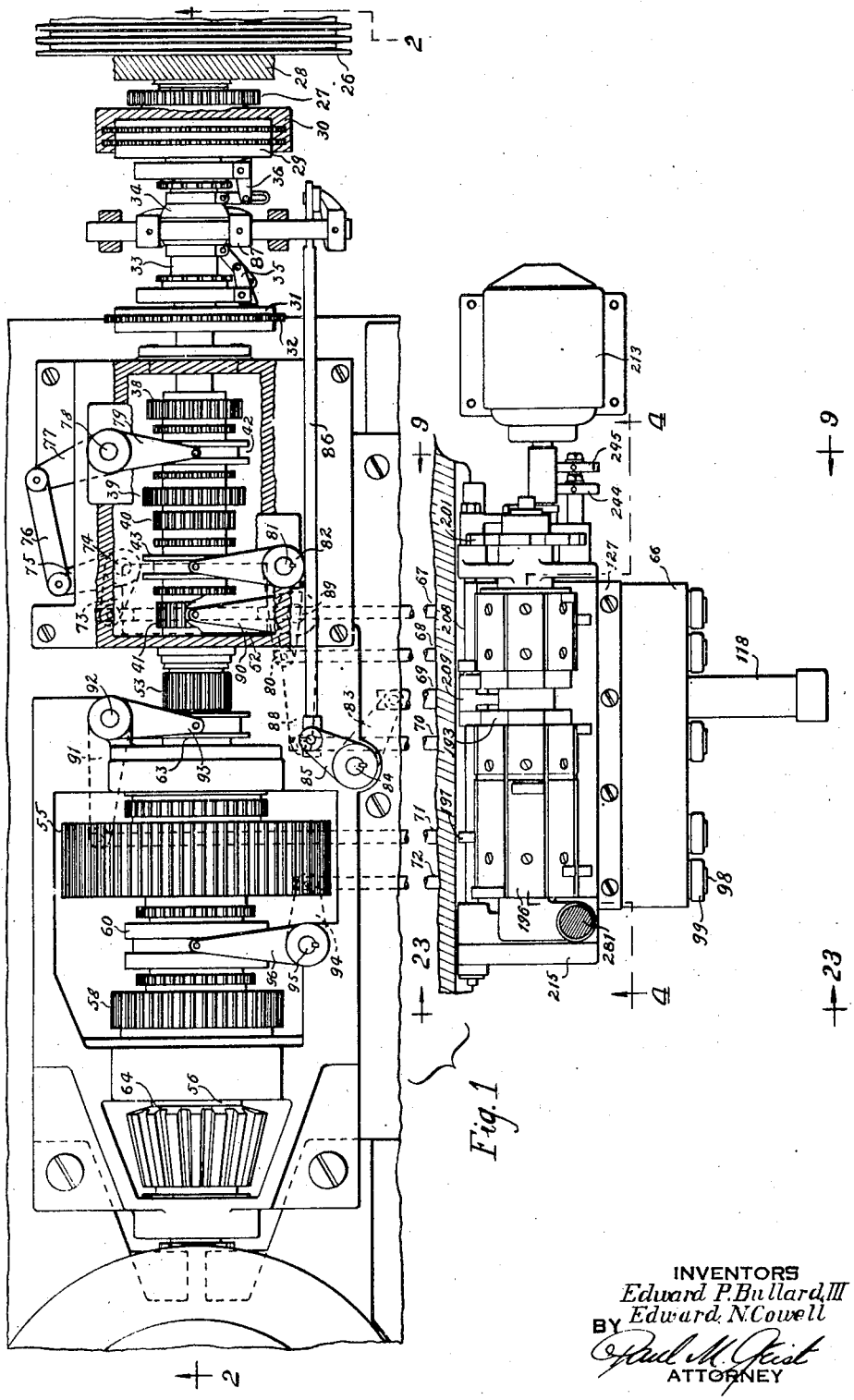
Figure 1 is a plan view of the transmission and a control therefor embodying the principles of this invention.

Figs. 11 to 22 inclusive are partial sectional views showing the cooperative relation between certain of the various manually-controlled means as viewed along lines 11—11 to 22—22, respectively, of Fig. 10; and Fig. 23 is an end elevational view, partly in section, as viewed along lines 23—23 of Figs. 1 and 4.

Referring to the drawings, the principles of the invention are shown as applied to a transmission of the type disclosed in application Serial No. 306,122, filed on November 25, 1939, in the names of E. P. Bullard, III, et al. and which has issued as Patent No. 2,355,624, dated August 15, 1944.

Referring to Figs. 1 and 2, the transmission comprises a driving shaft 25 that is driven from a prime mover (not shown) through a multiple V-groove pulley 26. The pulley 26 is keyed to an extended hub portion of a spur gear 27 that is journaled in a support 28. The hub of gear 27 is recessed to provide a bearing for the end of the driving shaft 25. The driving shaft 25 supports a multiple-disc friction clutch 29, the discs of which being provided with peripheral teeth. A clutch-driving element 30, having internal teeth adapted to mesh with the teeth on the periphery of the friction discs of clutch 29, is fixed to the gear 27. A friction brake 31 is likewise supported on the drive shaft 25, and comprises a friction disc 32 having peripheral teeth adapted to mesh with internal teeth disposed about an opening in a fixed supporting bracket 32'. Both the clutch 29 and the brake 31 are provided with metal discs on each side of the friction discs and which are splined to the drive shaft 25. A sleeve 33 surrounds the shaft 25 between the clutch 29 and the brake 31. It supports a slidable grooved spool 34 to which the one ends of toggle connectors 35, 36 are secured, the opposite ends of the connectors being fixed to certain of the movable metal discs of the clutch 29 and brake 31. Accordingly, axial movement of spool 34 alternately engages and releases the clutch 29 and brake 31.

The transmission is adapted to drive a driven member 37 at different predetermined speeds throughout a given range. In the present embodiment of the invention, as few gears as possible have been employed for producing the various speeds of rotation of the member 37.

Referring to Fig. 2, the transmission includes a primary unit $P_u$, a secondary unit $S_u$ and a tertiary unit $T_u$. These units are designed and constructed so that only parallel shafts are employed throughout the transmission, and certain gears are common to various units.

Four spur gears 38, 39, 40 and 41 are freely journaled on the drive shaft 25 and each gear is provided with positive-action clutch-engaging teeth arranged between gears 38, 39 and 40, 41. Slidable gear-engaging means 42, 43 are keyed to the driving shaft 25 and are located between respective gear sets 38, 39 and 40, 41. Thus, movement of the engaging means 42, 43 to the left or to the right will connect to shaft 25 either gears 39, 41 or gears 38, 40 respectively. A shaft 44 parallel with shaft 25 is provided in the transmission and is adapted to support four gears 45, 46, 47 and 48 arranged in units of two. These last-mentioned gears are keyed to the shaft 44 and each is retained in constant mesh with gears 38, 39, 40 and 41, respectively. The gears 38 to 41 and 45 to 48, both inclusive, comprise the primary unit $P_u$ of the transmission.

An additional parallel shaft 49 is provided in the transmission on which gears 50 and 51 are freely journaled. The gears 50 and 51 are likewise provided with positive-action clutch-engaging teeth on adjacent sides. A positive-action gear-engaging means 52 is keyed to the shaft 49 and is adapted selectively to engage the gears 50 and 51. The gear 50 on shaft 49 is adapted to be maintained in constant mesh with the gear 46 on shaft 44, while the gear 51 on shaft 49 is adapted to be maintained in constant mesh with an additional gear 53 integral with the shaft 44. Gears 46, 50, 51 and 53 comprise the secondary unit $S_u$. The shaft 44 acts as a common shaft between the primary and secondary units, and gear 46 serves a dual function in meshing with gear 39 of the primary unit and gear 50 of the secondary unit. By selectively shifting the means 42 and 43, shaft 44 can be driven at four separate and distinct speeds from the drive shaft 25. Furthermore, the shaft 49 may be driven at eight separate and distinct speeds from the drive shaft 25 by selectively shifting the means 42, 43 and 52.

The shaft 49 of the secondary unit is extended and forms one shaft of the tertiary unit $T_u$. The extended portion of shaft 49 is provided with gear teeth 54 adapted to be maintained in constant mesh with a gear 55 freely journaled on a driven shaft 56 forming the other shaft of the tertiary unit $T_u$. Likewise, the extended portion of shaft 49 fixedly supports a gear 57 adapted to be maintained in constant mesh with a gear 58 freely journaled on a sleeve 59, which latter is keyed to the driven shaft 56. Each of the gears 55 and 58 is provided with positive-action engaging means facing each other and disposed between the two gears. A shiftable engaging means 60, splined to sleeve 59, is provided between the last two gears for selectively engaging either. In as much as the shaft 49 may be driven at eight different speeds from the driving shaft 25 by shifting means 42, 43 and 52, it follows that selectively shifting said means and the means 60 of the tertiary unit $T_u$ will impart sixteen separate and distinct speeds of rotation to the driven shaft 56.

The driven shaft 56 is arranged coaxially with the shaft 44. This arrangement makes it possible to produce an additional four speeds of rotation of the driven shaft 56 from the driving shaft 25 by employing a single additional gear. Accordingly, the gear 53, fixed to shaft 44, is made longer than would be necessary for its proper meshing with gear 51. The end of driven shaft 56 adjacent the gear 53 is provided with a spline 61. An internal ring gear 62 is splined on the end of driven shaft 56 and is adapted selectively to be moved axially by shiftable element 63 to directly connect driven shaft 56 with shaft 44.

From an inspection of Fig. 2, it is evident that the driven shaft 56 may be driven at 20 different speeds while employing gears that remain constantly in mesh with their mating gears, thereby avoiding the difficulties common with constructions employing diving keys. Furthermore, the use of a common shaft between the secondary and primary units as well as common gears between units, together with the arrangement of the driven shaft 56 coaxial with shaft 44 of the primary and secondary units, tends to reduce to a minimum the number of gears in the transmission for a given number of different speeds of the driven member. Additionally, each gear combination in the primary, secondary and tertiary units is so designed that it may be used with any other gear combination in any other unit and the ability to employ the various gear combinations of each unit over and over, further minimizes the number of gear combinations required for a given number of specific speeds of the driven shaft 56.

The driven shaft 56 is provided with a bevel gear 64 at its end opposite that which contains spline 61. This bevel gear 64 meshes with a bevel ring-gear 65 fixed to the under surface of the member 37 to be driven.

The various gear combinations of the transmission are therefore adapted to be established by the operation of the shiftable means 42, 43, 52, 60 and 63. The clutch 29 and the brake 31 are alternately engaged and disengaged by the action of the slidable spool 34. Referring to Fig. 1, a bracket 66 is provided, within which a plurality of rods 67, 68, 69, 70, 71 and 72 are located. These rods are connected to the shiftable means 42, 43, 52, 60, 63 and spool 34 within the transmission through linkages to be described. Accordingly, selective axial shifting of the rods effects shifting of the shiftable means and spool 34 within the transmission.

Referring to Fig. 1, the bracket 66 is bolted to the housing containing the transmission. The series of six parallel rods 67, 68, 69, 70, 71 and 72 extend from within the bracket 66 through the transmission housing and are connected to the various shiftable elements of the transmission as follows.

The rod 67 extends to a point on the far side of the transmission and is connected to a lever 73 that is fixed to a vertically-disposed shaft 74. The upper end of the shaft 74 has a lever 75 fixed to it which forms a bell-crank with the lever 73. Lever 75 is connected to a link 76 which in turn is connected to a lever 77 fixed to the lower end of a shaft 78. The upper end of shaft 78 fixedly supports a yoke 79 that engages the shiftable element 42 so that reciprocable movement of the rod 67 moves the element 42 to the right and left thereby selectively connecting gears 38 and 39 to the driving shaft 25.

Rod 68 extends into the transmission housing and is connected to a lever 80 which latter is fixed to a vertically-disposed shaft 81 extending upwardly to a point adjacent the primary unit $P_u$. The upper end of the rod 81 rigidly supports a yoke 82, that engages the shiftable element 43.

The rod 69 is pivoted to a lever 83 that is rigidly connected to a vertically-disposed shaft 84. The shaft 84 extends vertically to a point near the top of the transmission. The upper end of shaft 84 fixedly supports a lever 85 that is pivoted to a pull-rod 86 connected to an arm of an oscillatable yoke 87. The yoke 87 engages the spool 34 on the driving shaft 25 between the clutch 29 and brake 31.

Rod 70 extends into the transmission housing where it is connected to a lever 88 fixed to a pivot shaft 89. The pivot shaft 89 has rigidly fixed thereto a yoke 90 which is adapted to engage the shiftable element 52 of the secondary unit.

Rod 71 extends to the far side of the transmission where it is connected to a lever 91 rigidly fixed to a pivot shaft 92. The shaft 92 fixedly supports a yoke 93 that engages the shiftable element 63 for directly connecting the driven shaft 56 to the shaft 44.

The rod 72 is connected to a lever 94 fixed on a pivot shaft 95. The shaft 95 rigidly supports a yoke 96 that engages the shiftable element 60 of the tertiary unit Tu.

From the foregoing it is evident that selective reciprocation of the rods 67, 68, 69, 70, 71 and 72 will set up various gear combinations and effect shifting of clutch 29 and brake 31 within the transmission to provide twenty different rates at which the driven shaft 56 may be rotated.

Referring to Fig. 3, the rods 67, 68, 69, 70, 71 and 72 are connected to pistons adapted to be reciprocated within cylinders formed in the bracket 66. Inasmuch as each piston and its associated structure for each of the rods is identical with the exception of that for rod 69, only the piston and associated structure for rods 72 and 69 will be specifically described. The bracket 66 is provided with a cylindrical bore 97 that extends entirely therethrough. The outer end of bore 97 is closed by a plug 98 that is sealed against the leakage of fluid by a nut 99 and packing 100. A piston 101 provided with an integral connecting rod 102 and an integral tail-rod 103 is adapted to be reciprocated within a portion of the bore 97. A closure member 104 is fixedly secured in the inner end of bore 97 and a member 105 is fixed substantially centrally within said bore. Each of the members 104 and 105 is bored to receive the rods 102 and 103, respectively. The rod 72 is pivotally pinned to the connecting rod 102. The tail-rod 103 is reduced in diameter forming a shoulder 106, and the reduced portion extends into a recess 107 within the plug 98. The end of tail-rod 103 is provided with a collar 108 which forms a shoulder 109 with the portion of tail-rod 103 that is of reduced diameter. The closure members 104 and 105 define a chamber within which the piston 101 is adapted to be reciprocated. A spacing sleeve 110 is provided between the plug 98 and the closure member 105, defining a chamber within which split piston members 111 and 112 are adapted to reciprocate. Fluid pressure means, to be described later, is provided for moving piston 101 in either direction, and for constantly supplying fluid under pressure to the chamber in which split piston members 111 and 112 reciprocate. As shown in Fig. 3, piston 101 is in a position to the right of its central or neutral position. The shoulder 106 has forced the split piston member 111 to the right while the plug 98 engages and fixes the piston member 112. Upon release of the fluid pressure that has moved piston 101 to the right, split piston members 111 and 112 will instantly separate and move piston 101 to its neutral position. Upon movement of piston 101 to the left as viewed in Fig. 3, shoulder 109 moves member 112 to the left, while the closure member 105 prevents leftward movement of the member 111. Upon release of the pressure that moves piston 101 to the left, the portions 111 and 112 separate thereby neutralizing piston 101. A hole 114 is drilled through the connecting rod 102, piston 101 and tail-rod 103 which opens at its one end into the recess 107 and at its other end into the housing of the transmission. The function of hole 114 is to exhaust into the housing of the transmission any fluid that might leak past the several pistons. The piston 101 for rod 72, as well as the corresponding piston for rod 71 is provided with a centrally-disposed annular groove 115, into which an interference detent 116 is adapted to be forced upon movement of either of the pistons 101 from their central or neutral positions. This interfering device prevents the accidental shifting of either of rods 71 or 72 when the other is out of its neutral position.

Rod 69 which is adapted to shift the clutch 29 and brake 31, is pivotally connected to a piston member 117 adapted to be reciprocated within an elongated cylindrical sleeve 118 fixed within a bore 119 of the bracket 66 by pins 120. The piston member 117 is provided with a cam surface 121 for a purpose to be described later. It also includes plunger portions 122 and 123 rigidly fixed in spaced relation on a connecting rod 124. A separating element 125 is fixed within the bore of sleeve 118 and is drilled to receive the connecting rod 124. The construction and arrangement is such that the plunger portions 122 and 123 are located on opposite sides of the separating member 125, thereby forming in effect a compound piston arrangement. Fluid-pressure is adapted to be admitted into the space between the plunger portions 122 and 123 and opposite sides of the separating member 125 for shifting the piston 117 and the rod 69 in opposite directions for effecting alternate engagement and disengagement of the clutch 29 and brake 31. A drilled passage 126 extends axially through the rod 124 and piston 117 for the purpose of exhausting into the transmission housing any fluid that may leak past the plunger portions 122 and 123.

Referring to Figs. 4 and 5, a valve body 127 is mounted on bracket 66 and includes a series of bores 128 extending therethrough, arranged in a common plane and in parallel relation. Valve mechanisms 129, 129', 130, 131, 132, 132', 133, 133', 134 and 134' are adapted to be reciprocated within said passages 128 for controlling the admission of fluid under pressure to, and the exhaust from the cylinders in which the pistons 101 are adapted to reciprocate. The pistons 101 which are connected to the rods 72, 70, 68, and 67 are adapted to be moved to opposite sides of a neutral position for shifting the shiftable elements 60, 52, 43 and 42, respectively, within the transmission. Accordingly, these pistons are provided with substantially identical valve actuating mechanism 129, 129', 132, 132', 133, 133' and 134, 134'. The piston 101 that is connected to the rod 71 is adapted to be moved to only one side of a neutral position and accordingly, only a single valve actuating mechanism 130 is provided therefor. The valve actuating mechanism 131 is employed for a purpose to be described later.

The valve body 127 is provided with a passage 135 in which a compound valve-actuating mechanism 136 is adapted to be reciprocated for controlling the admission of fluid under pressure to, and the exhaust from the piston 117 that is adapted to effect shifting of the clutch 29 and brake 31. In order to supply all of the valve actuating mechanisms with fluid under pressure, a passage 137 is provided that extends throughout the length of the valve body 127 and which intersects all of the passages 128 as well as the passage 135. The specific construction of the valve-actuating mechanism 136 is such that the passage 137 does not extend thereacross and in order to by-pass the fluid under pressure around the valve mechanism 136, passage 135 is provided with a counter-sunk portion 138 at its bottom extremity, namely at the dividing line between the valve body 127 and the bracket 66, and a pair of holes 139 are drilled from the counter-sunk portion 138 to the passage 137.

The bracket 66 is additionally provided with a passage 140 that extends throughout its entire length and with which each of the passages 128 communicates. The passage 140 exhausts to the transmission housing through a series of spaced parallel ducts 140'. The opposite ends of passage 140 are provided with plugs 141, as are all of the openings in the valve body 127 and bracket 66 that are formed by drills and which require a sealing means. From the foregoing, it is apparent that fluid passing through an inlet 142 of the valve body 127 is distributed to all of the valve actuating mechanisms within the valve body.

Inasmuch as the construction and operation of the valve mechanisms 129, 129', 132, 132', 133, 133', and 134, 134' are identical, only the construction and operation of the valve mechanism 129, 129' will be specifically described.

Referring to Fig. 5, the passage 128 is provided at its lower extremity with a tubular insert 143 having a scalloped upper edge 144 in registry with the fluid inlet passage 137. A passage 145 is provided in the block 127 which communicates with a drilled hole in the side of the tubular element 143. Passage 145 communicates with passages 146 and 147 which latter opens into the bore 97 on the left side of the piston 101 as viewed in Fig. 5. Another passage 148 in the valve body 127 is in registry with the inlet 137 between the adjacent bores 128 in which valve mechanisms, 129, 129', reciprocate. Passage 148 communicates with passages 149, 150, 151 and delivers fluid under pressure to annular space 152 formed between the split piston members 111 and 112.

The valve-actuating mechanism 129 comprises two parts, a lower part 153 and an upper part 154. The lower part 153 includes a plunger portion 155 that is adapted to be reciprocated within the passage 128 and to seat on top of the scalloped edge 144 of the tubular member 143. Member 153 also includes a downwardly extending valve stem 156 on the lower end of which is provided a valve member 157. In the position of the lower portion 153 as shown in Fig. 5, wherein it is seated on the top of the scalloped edge 144 of the tubular member 143, it is evident that fluid under pressure enters the center of the tubular member 143 from the passage 137, passes through the passages 145, 146 and 147 into the bore 97 on the left hand side of piston 101 thereby forcing said piston to the right. Likewise, fluid pressure is admitted from duct 137 through the passages 148, 149, 150 and 151 to the annular space 152 formed between the split piston members 111 and 112. Even though this pressure is the same as that which acts on piston 101, the differential area between the piston 101 and the piston members 111 and 112 is such that the latter is overcome by the former and the piston 101 moves to the right. Upon release of the force which holds the portion 153 in its lower position, the pressure from inlet 137 acts on the area of plunger portion 155 adjacent the scalloped portion 144 of tubular member 143, which area is greater than that of the valve member 157 against which said pressure also acts. Accordingly, the lower portion 153 of the valve mechanism 129 is raised to an upper position, cutting off the passage of fluid from inlet 137 to passage 145 and permitting the fluid trapped within the bore 97 on the left side of piston 101 to by-pass the valve 157 to the exhaust passage 140, thence the exhaust passes through one of the ducts 140' to the interior of the transmission housing. Immediately upon cutting off the inlet pressure from passage 137 to the passage 145, split piston members 111 and 112 are separated as previously explained thereby moving piston 101 to its neutral position.

Fluid under pressure is admitted in an identical manner to the right side of piston 101 in the space formed between it and the left side of closure member 105 by the valve actuating mechanism 129' (Fig. 4) as follows. A passage 159 (Fig. 5) is provided in the valve body 127 which communicates with a tubular member within the passage 128 that receives valve-actuating mechanism 129' in the same manner that passage 145 communicates with the interior of the tubular member 143. Passage 159 communicates with passages 160 and 161 which latter delivers fluid into the space formed between the right and left hand faces of the piston 101 and the closure member 105, respectively. From the foregoing it is evident that movement of the valve actuating mechanism 129' to its lower position permits the fluid under pressure from passage 137 to flow through the ducts 159, 160 and 161 into the bore 97 on the right side of piston 101 thereby forcing piston 101 to the left. Upon release of the force holding the actuating mechanism 129' in its lower position, its lower portion moves upwardly and exhausts the fluid trapped on the right side of piston 101 to the passages 140 and 140'. When this occurs, of course, the pressure acting on the split piston members 111 and 112 instantly separates them thereby effecting movement of piston 101 to its neutral position.

The upper portion 154 of the valve-actuating mechanism 129 includes a stem portion 162 and an abutment portion 163 which latter is adapted to be engaged by means to be described later for forcing the portion 154 downwardly. The abutment portion 163 includes a shoulder 154' that is adapted to engage shoulders formed between a series of narrow removable plates 163' that form the top of valve body 127. The upper portion of the valve-actuating mechanism 129' is identical with that of mechanism 129. From the foregoing it is apparent that the selective depression of the valve-actuating mechanisms 129 and 129' will cause the piston 101 to be moved to either side of its neutral position thereby effecting the shifting of shiftable element 60 of the transmission. In an identical manner, the selective depression of the valve-actuating mechanisms 132, 132', 133, 133', and 134, 134' effects the shifting of rods 70, 68 and 67, respectively, to thereby shift the shiftable elements 52, 43 and 42 of the transmission.

Figure 6:
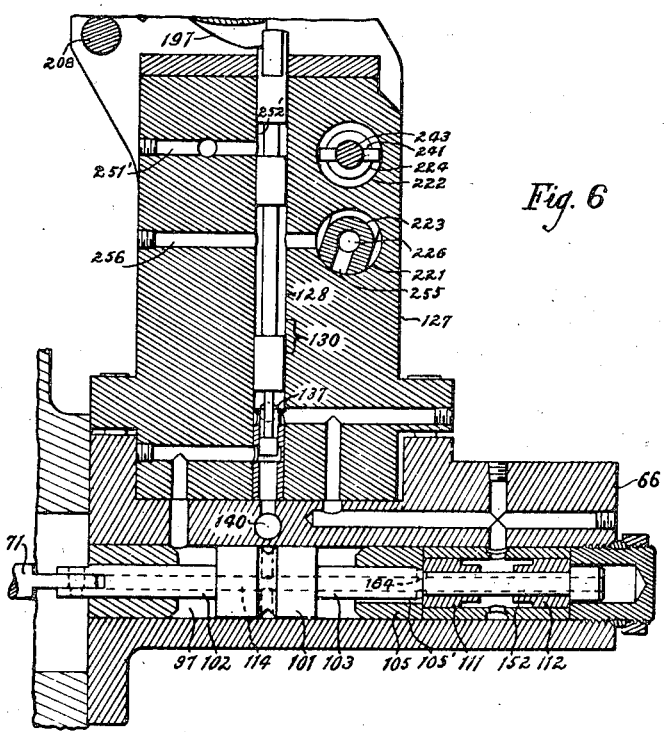
Fig. 6 is a sectional elevational view taken substantially along line 6—6 of Fig. 4.

Referring to Fig. 6, the valve mechanism 130 is identical with the valve mechanism 129 (Fig. 5). Movement of the mechanism 130 to its lower position admits fluid from the inlet 137 to the left side of the piston 101 that is connected to the rod 71, thereby forcing said piston to the right to shift element 63 of the transmission to engage the direct drive between driven shaft 56 and shaft 44. Upon release of the means that moves the valve mechanism 130 to its lower position, pressure from the inlet 137 will effect the upward movement of the valve 130 in the same manner as it moves the valve mechanism 129 to its upper position. In its upper position, valve 130 exhausts the fluid trapped on the left side of piston 101 to the passage 140, while at the same time, pressure from the inlet 137 that is continuously acting upon the split piston members 111 and 112 of the assembly disclosed in Fig. 6, moves the piston 101 to its neutral position. The closure member 105 in this instance is provided with a groove 105' in communication with a radial passage 164 that leads to the exhaust passage 114 extending through the piston 101 and its connecting and tail-rods. This construction permits the exhausting of any fluid that may leak past the piston 101 and become trapped on the right side thereof.

Figure 7:
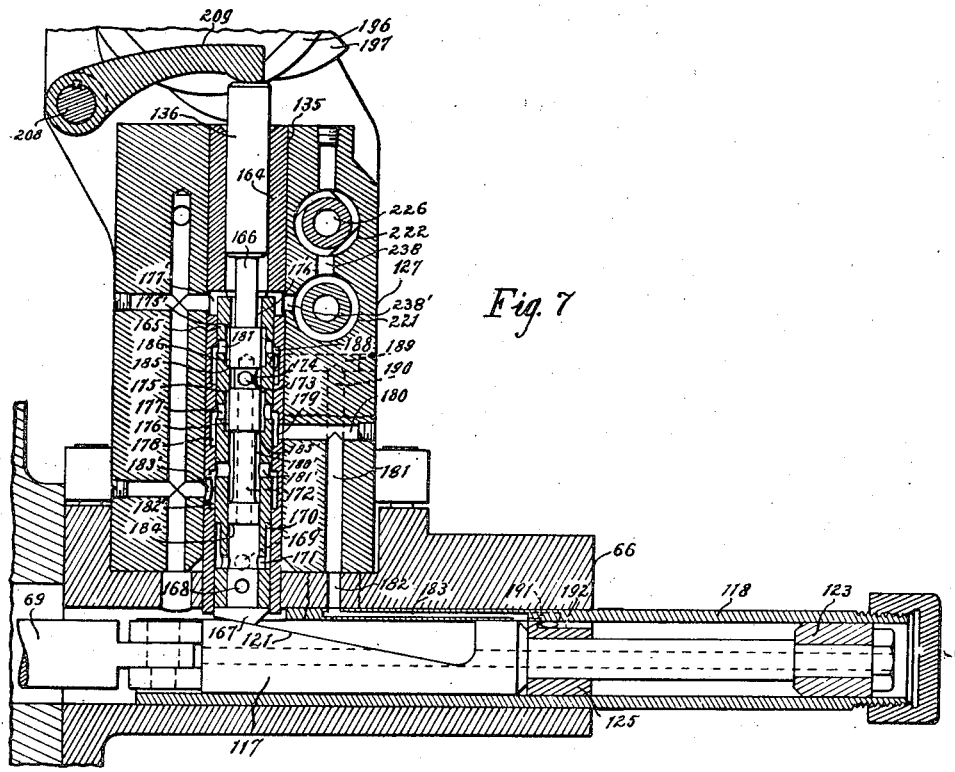
Fig. 7 is a sectional elevational view taken substantially along line 7—7 of Fig. 4.

Referring to Fig. 7, the valve mechanism 136 within the bore 135 of the valve body 127 is designed for dual functioning, namely, for manual as well as automatic operation. Although the specific construction of the valve mechanism 136 is essentially for manual manipulation of the apparatus, it also functions automatically. Even though its significance relative to manual manipulation of the apparatus will not appear until later, its specific construction will now be described. Essentially, the valve mechanism 136 comprises a sleeve 164 fixed within the bore 135, a vertically-reciprocable sleeve 165 mounted within the sleeve 164, and a vertically-reciprocable valve stem 166 mounted within sleeve 165.

A cam follower 167, adapted to cooperate with the cam surface 121 of the piston 117, is provided with a plug extending up into the vertically-reciprocable sleeve 165 and which is fixed to said sleeve by a pin 168.

Referring to Fig. 4, the countersunk portion 138 of the bore 135 that communicates with passages 139 and inlet passage 137 is also adapted to communicate with radial passages 169 that extend through the fixed sleeve 164.

Referring again to Fig. 7, radial passages 169 communicate with an annular chamber 170 formed between the sleeves 164 and 165. Radial passages 171 that extend through the sleeve 165 provide communication between the interior of sleeve 165 and said annular chamber 170. The vertically-reciprocable valve stem 166 is provided with an axial bore 172 extending partially therethrough, and a radial passage 173 near its upper end, at the dead end of said bore. The radial passage 173 communicates with a chamber 174 formed between the slidable sleeve 165 and the stem 166. The construction and arrangement is such that slight downward movement of the valve stem 166 will effect separation of a contact point 175 between the valve stem 166 and the sleeve 165. Such separation provides communication between the annular chamber 174 and another annular chamber 176 formed between the sleeve 165 and the stem 166. The sleeve 165 is provided with radial bores 177 that communicate with an annular chamber 178 formed between the slidable sleeve 165 and the fixed sleeve 164. A radial bore 179 is provided in the fixed sleeve 164 in alignment with a passage 180 formed in the valve body 127. A vertically-disposed passage 181, within the valve body 127, is in communication with the passage 180 and also with a passage 182 formed in the bracket 66. The passage 182 in bracket 66 communicates with a passage 183 that opens into the space between the separating element 125 within the cylinder 118 and the right hand side of piston 117. Accordingly, the downward movement of the valve stem 166 permits the fluid under pressure from port 169 to pass upwardly through passage 172, through port 173 into chambers 174, 176, through port 177 into chamber 178, thence through port 179 into passages 180, 181, 182, and 183 into cylinder 118 on the right hand side of piston 117 causing the same to be moved to the left. Slight leftward movement of piston 117 tends to move the cam surface 121 away from the cam follower 167. However, the fluid under pressure entering the ports 171 of the slidable sleeve 165 acts upon the upper face of the plug connected to cam follower 167 and causes downward movement of the cam follower and sleeve 165. Slight downward movement of the sleeve 165 causes re-engagement of the sleeve 165 and stem 166 at point 175 thereby cutting off the supply of fluid under pressure from chamber 174 to chamber 176, whereupon the assembly assumes the position shown in Fig. 7. Continued downward movement of the valve stem 166 again effects separation of the contacting point 175 re-establishing communication between the chambers 174 and 176 whereupon continued leftward movement of the piston 117 occurs. However, sleeve 165 is again lowered by virtue of cam surface 121 moving to the left causing re-engagement of the sleeve 165 and stem 166 at point 175 thereby stopping the leftward movement of piston 117. This intermittent supplying of fluid under pressure to chamber 176 effects an incremental movement of piston 117 until the shiftable rod 69 is moved to its maximum leftward position. However, as will appear later on, such action only occurs during the manual operation of the valve mechanism 136 since during automatic operation, the valve stem 166 is moved instantly to its lowest position causing instant and complete leftward movement of the piston 117.

Upon release of the force that has moved stem 166 to its lowest position, the fluid pressure entering sleeve 165 through ports 171 acts upon an annular surface 184 at the bottom of the stem 166 causing the same to move upwardly. Slight upward movement of the valve stem 166 effects the separation of the sleeve 165 and stem 166 at a point 185, whereupon chamber 174 communicates with an annular chamber 186 formed between the sleeve 165 and the stem 166. Radial ports 187 extend through the walls of sleeve 165, and communicate with an annular chamber 188 formed between the slidable sleeve 165 and fixed sleeve 164. A passage 189 formed in the valve body 127 communicates with the chamber 188 and also with a vertically-disposed passage 190 that extends downwardly in parallel but spaced relation with respect to the passage 181. The vertically-disposed passage 190 communicates with a passage 191 in the bracket 66 which latter passage communicates with a groove 192 in the separating member 125 within cylinder 118. Groove 192 in turn communicates with the space formed between the right face of separating member 125 and the left face of plunger portion 123. Accordingly, upon slight upward movement of stem 166, fluid under pressure is adapted to pass from chamber 174 to chamber 186, port 187, chamber 188, passages 189, 190, 191, 192 and to act upon the left face of plunger member 23 causing plunger 117 and rod 69 to move to the right. Slight movement of plunger 117 to the right causes cam surface 121 to act against follower 167 forcing vertically-reciprocable sleeve 165 upwardly whereupon the sleeve 165 and stem 166 re-engage at point 185 thereby cutting off the supply of fluid under pressure to chamber 186 and stopping the rightward movement of piston 117. The upward movement of stem 166 is continuous and the sleeve 165 follows it upwardly until both slidable members reach their maximum upward position where they remain until further downward movement of the stem 166. At all times, the slidable members 165 and 166 tend to assume the position shown in Fig. 7. Slight upward movement of valve stem 166 not only separates the sleeve 165 and stem 166 at the contact point 185 to admit fluid under pressure to the left side of piston member 123, but it also separates a contact point 185' between said stem 166 and sleeve 165, whereupon chamber 176 communicates with a chamber 180' formed between the stem 166 and sleeve 165. Radial passages 181' are provided in the sleeve 165 which communicate with a chamber 182' formed between the sleeves 164 and 165. A radial passage 183' in sleeve 164 opens into the exhaust line leading to the transmission housing. Accordingly, as the piston 117 moves to the right, fluid trapped between it and the left side of partition 125 exhausts through passages 183, 182, 181, 180, through port 179 into chamber 178, through port 177 into chamber 176, thence into chamber 180', through port 181', into chamber 182', through port 183' to the transmission housing. Additionally, as the stem 166 moves downwardly, it not only causes separation of sleeve 165 and stem 166 at contact point 175, but also causes separation of a contact point 175' between said stem and sleeve. Accordingly, upon downward movement of stem 166, any fluid trapped between the right and left faces of members 125 and 123, respectively, will be exhausted through passages 192, 191, 190, 189, into chamber 188, through port 187 to chamber 186, thence into a chamber 176' that opens into a chamber 177' which latter communicates with the exhaust that leads to the transmission housing.

From the foregoing description, it is evident that downward movement of the stem 166 causes piston 117 to move to the left thereby disengaging the clutch 29 and engaging the brake 31, and upon release of the force moving stem 166 downwardly, the same rises automatically thereby causing piston 117 to move to the right which disengages brake 31 and engages clutch 29.

The selective depression of valve mechanisms 129, 129', 130, 132, 132', 133, 133', 134 and 134' is effected by the step by step movement of a program drum 193 (Fig. 4) that is adapted to be indexed about a horizontal axis. The drum 193 is positioned directly above the valve body 127 such that its axial center line is in the same plane as that which contains the valve mechansm for the pistons 101. The program drum 193 comprises a polygonally-faced member in which a groove 195 is formed to provide a space for the means that actuates valve mechanism 136, to be described later. The drum is provided with trunnions journaled in bearings 194 and 194' formed on brackets mounted on the body 127. Each of the faces of the polygonally-shaped member is provided with dove-tail grooves for receiving replaceable plates 196 that are adapted to support shoes 197 for engaging the abutment portions 163 at the upper ends of the various valve-actuating mechanisms. The plates 196 are fixed in place on the program drum 193 by screws 198. The shoes 197 on plates 196 on the right side of the groove 195 (Fig. 4) are adapted to control the valve actuating mechanisms 133, 133' and 134, 134', which in turn control the admission of fluid pressure to, and exhaust from the opposite sides of the pistons 101 that are connected to rods 67 and 68, the movement of which controls the shiftable elements 42 and 43 of the primary unit Pu of the transmission. The shoes 197 on plates 196 on the left side of the groove 195 are adapted to control the shifting of shiftable elements for the secondary unit Su, tertiary unit Tu and the direct drive. Various combinations of the plates 196 may readily be assembled to provide a definite program, and upon the successive indexing of the drum 193, a succession of different rates of rotation of the driven shaft 56 of the transmission may be effected.

Prior to the changing of any gear combination within the transmission, it is necessary to disengage the clutch 29 and to engage the brake 31 in order to stop the transmission; and upon effecting a new gear combination within the transmission, it is necessary to disengage the brake 31 and to re-engage the clutch 29.

Figure 9:
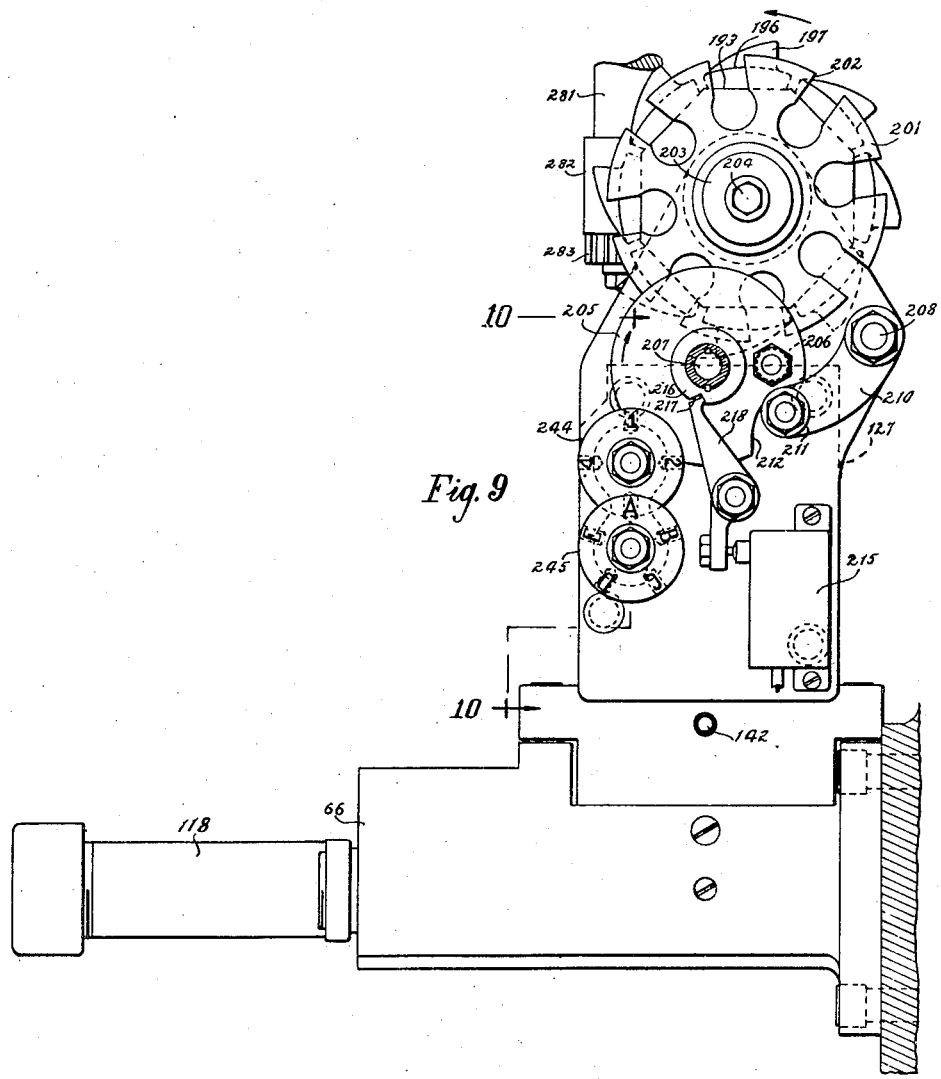
Fig. 9 is an end elevational view of the control mechanism as viewed along line 9—9 of Fig. 1.

Referring to Figs. 1, 4 and 9 and particularly Fig. 9, a Geneva stop wheel 201 is provided with as many radial slots 202 as there are sides to the polygonally-shaped drum 193. This wheel 201 is fixed to the end of one of the trunnions of the program drum 193 by a washer 203 and a lock bolt 204. An indexing disc 205, provided with a roll 206 adapted to cooperate with the radial grooves 202, is mounted on a shaft 207 parallel with but spaced from the trunnions of the program drum 193. The disc 205 is adapted to be rotated in a clockwise direction and is provided with means forming a time-delay actuating mechanism for controlling the admission of fluid under pressure to the piston 117 for shifting the clutch 29 and brake 31. A shaft 208 mounted in brackets at the back of the valve body 127 is adapted to extend throughout substantially the entire length thereof (Fig. 1). The shaft 208 fixedly supports a rocker arm 209 within the groove 195 (Fig. 4) and in alignment with the valve-actuating mechanism 136. Referring to Fig. 9, the end of the shaft 208 rigidly supports an arm 210 having a follower 211 in the plane containing the disc 205. The follower 211 is adapted to ride on the periphery of disc 205. The fluid pressure continuously urging the valve stem 166 of the valve mechanism 136 upwardly, forces the rocker arm 209 upwardly and consequently the arm 210 towards the disc 205 such that the roller 211 is maintained in constant engagement with the periphery of said disc 205.

A recessed portion 212 is formed in the periphery of the disc 205 within which follower 211 normally rests. The construction and arrangement is such that as the disc 205 initially moves in a clockwise direction from the position shown in Fig. 9, the shaft 208 is turned in a counter-clockwise direction thereby depressing the valve stem 166 of the valve mechanism 136. The roll 206 however does not engage the next succeeding radial slot 202 of the Geneva stop wheel 201 for a substantially long time interval after the depression of valve mechanism 136. Accordingly, during this substantial time interval before the indexing of drum 193, the main clutch 29 is disengaged and the brake 31 engaged to stop the transmission. As the disc 205 continues to rotate, roll 206 engages a slot 202 in the Geneva wheel 201 and indexes the program drum one step. Upon the completion of the indexing movement of the program drum 193, the recess 212 returns to cooperative position with the roll 211, thereby permitting the fluid under pressure to raise the valve means 136 effecting disengagement of the brake 31 and re-engagement of the clutch 29.

Referring to Figs. 1 and 4, power is supplied to the disc 205 through a motor 213 and a gear reduction unit. The circuit of the motor 213 includes a push button switch (not shown), in parallel with a holding switch 215 (Fig. 9). Upon closing the push button switch, the motor 213 begins to rotate and to drive the disc 205 in a clockwise direction. A cam disc 216 fixed to rotate with disc 205 is provided with a notch 217 into which the one end of a lever 218 is resiliently urged. Upon the beginning of rotation of the disc 205, the lever 218 is moved in a counter-clockwise direction closing holding switch 215 and maintaining it closed after the release of the push button switch. Upon the completion of a single revolution of the disc 205, when roll 211 is within the recess 212 again, lever 218 cooperates with groove 217 thereby effecting the opening of holding switch 215 and stopping motor 213.

In order to prevent vibrations from changing the position of the program drum 193 between successive indexing movements, a lever 219 (Figs. 4 and 8) is journaled on the shaft 208. A spring pressed member 220 mounted in the valve body 127 is adapted to resiliently force the lever 219 upwardly into engagement with the sides of the polygonally-shaped drum 193.

Referring to Figs. 1 to 5, inclusive, the program drum 193 is shown in position such that valve mechanisms 129, 132 and 133 are depressed to their lower positions. With valve mechanism 129 in its lower position, fluid is admitted under pressure to the left side of the piston 101 that is connected to rod 72 thereby shifting element 60 of the transmission to the right (Fig. 1) connecting gear 55 to driven shaft 56. Valve mechanism 132 in its lower position admits fluid under pressure to the left side of the piston 101 that is connected to the rod 70 thereby shifting element 52 of the secondary unit S$_u$ to the left (Fig. 2) connecting gear 51 to shaft 49. Valve mechanism 133 in its lower position admits fluid under pressure to the left side of the piston 101 connected to the rod 68 thereby shifting element 43 of the transmission to the left connecting gear 41 to shaft 25. Referring to Fig. 2, the gear train that is established in the transmission by the control mechanism in the position shown in Fig. 4 is such that power is transmitted from shaft 25 to gear 41, gear 48, thence through gear 53 to gear 51, and finally from gear 54 to gear 55. Upon indexing the program drum 193, the shoes 197 are so located that valve mechanism 129' is moved to its lower position while valve 129 is permitted to move to its upper position; valve mechanism 132' is lowered while valve mechanism 132 is permitted to rise; and valve mechanism 133' is lowered while valve mechanism 133 is elevated. Accordingly, upon indexing drum 193 to its next succeeding position, fluid under pressure will be admitted to the right side of the piston 101 connected to the rod 72 whereupon shiftable element 60 of the transmission is moved to the left (Fig. 1) connecting gear 58 to shaft 56; fluid pressure is admitted to the right side of the piston 101 connected to the rod 70 whereupon the shiftable element 52 of the secondary unit S$_u$ is shifted to the right connecting gear 50 to shaft 49; and fluid pressure is admitted to the right side of the piston 101 connected to the rod 68 whereupon shiftable element 43 is moved to the right (Fig. 1) connecting gear 40 to shaft 25. Power will then be transmitted from the shaft 25 to the gear 40, gear 47, thence through the gears 46 and 50, and finally through the gears 57 and 58. From the foregoing description, it is evident that the transmission includes means (42, 43, 52, 60, 63 and associated structure) adapted to be actuated for establishing various operative gear combinations within the transmission, and the control (including drum 193, Geneva stop 201, disc 205 and attending apparatus) is adapted to perform successive cycles of operation (neutralizing clutch 29, applying brake 31, indexing drum 193 at a time substantially after brake 31 has been applied, disengaging brake 31 and engaging clutch 29), in each cycle of which any of the means for establishing operative gear combinations is adapted to be actuated.

The present invention contemplates the provision of mechanism for manually selecting various gear combinations within the transmission without disturbing the setting of the program drum 193. In other words, the invention includes means associated with the program drum 193 for rendering effective, manually-operable means for shifting the shiftable elements within the transmission which means is adapted to become effective at the end of a predetermined program of operation of the transmission.

Referring to Fig. 10 the valve body 127 is provided with bores 221 and 222 arranged in parallel relation, extending throughout the entire length thereof and adapted to receive valve plugs 223 and 224. The valve plugs 223 and 224 comprise elongated cylindrical members having bosses 225 formed thereon through which ports extend from the exterior thereof to a passage 226 drilled axially of said plugs. The outer surfaces of the bosses 225 are machined to accurately fit the bores 221 and 222, and said bosses are arranged in such manner that they cooperate with means to be described later for controlling the admission of fluid under pressure to, and for exhausting the fluid under pressure from the operative sides of the pistons 101 for effecting shifting of the shiftable elements within the transmission. Closure members 227 and 228 are fixed to the sides of the valve body 127 and bearings are formed therein for receiving and journaling parts of the plug valves 223 and 224. Each of the plug valves 223 and 224 is provided with flanged portions 233 that are axially spaced and of a diameter accurately fitting the bores 221 and 222.

Recesses 234 are formed between the spaced flanges 233 in alignment with a passage 235 within the wall separating the bores 221 and 222. Radial passages 236 extend from the recesses 234 to the axial bore 226 of the plug valves 223 and 224. An inlet passage 237 is provided within the valve body 127 which communicates with the recesses 234 as well as the valve actuating mechanism 131 (Fig. 8) that in turn controls the admission of fluid under pressure to the plug valves 223 and 224. The spaces between the various bosses 225 on the exterior of the plug valves 223 and 224 form exhaust chambers with the bores 221, 222. Communication between the bores 221, 222 for said exhaust chambers on the right hand side of flanges 233 is provided by the passage 238. A passage 239 is provided between the bosses 221, 222 on the left hand side of flanges 233 to exhaust any leakage past flanges 233 in bore 222. A passage 240 (Fig. 13) is provided within the valve body 127 that leads to the housing of the transmission, to which the exhaust fluid from the left hand side of flanges 233 in bores 221, 222 is returned. A passage 238' is provided in the body 127 for exhausting the fluid from the right hand side of flanges 233 in bores 221, 222 into chamber 177' (Figs. 7 and 18) thence to the housing of the transmission.

From an inspection of Fig. 10 it is evident that substantially perfect alignment between the bore 222 and that for bearing 229 must be provided since the bosses 225 and the flanges 233 on the plug valve 224 must accurately fit said bore 222. Perfect alignment of the axes of the bore for bearing 229 and the bore 222, is provided, and the arrangement includes forming the bearing 230 for the rear end of the plug valve 224 without regard to precise alignment between it and the bore 222 and bearing 229. The end of plug valve 224 opposite that journaled in bearing 229 is provided with a pin receiving slot 241, and a trunnion within bearing 230 is provided with a similar slot 242. A shaft 243 extends between the trunnion within bearing 230 and the end of plug valve 224 containing pin slot 241. Shaft 243 is provided with pins adapted to engage the respective slots 241 and 242, thereby producing a construction that will permit slight misalignment of the axis of bearing 230 with those of bearing 229 and bore 222. A similar construction is employed in connection with the plug valve 223 as clearly shown in Fig. 10.

Handwheels 244 and 245 are connected to the extensions of the plug valves 224 and 223 that are journaled in bearings 229, 231. These handwheels contain numbers 1 to 4 and letters A to E (Fig. 9). The numerals 1 to 4 represent the four rotative positions plug valve 224 is adapted to assume, while the letters A to E represent the five rotative positions plug valve 223 is adapted to assume. Accordingly, rotation of the hand wheels 244 and 245 will effect rotary movement of the plug valves 223 and 224 for controlling the admission of fluid under pressure to the various pistons 101 in a manner to be described later.

Referring to Figs. 4 and 8, the valve mechanism 131 is adapted to control the admission of fluid under pressure to the plug valves 223 and 224 (Fig. 10). Referring particularly to Fig. 8, the valve mechanism 131 is identical with the valve mechanism 129 (Fig. 5). Movement of the mechanism 131 to its lower position will permit fluid under pressure from the inlet 137 to flow past the valve head 157 into a passage 246 that communicates with the vertically-disposed passage 237 that leads to the recesses 234 between the flanges 233 of the plug valves 223 and 224. Upon release of the force which holds the valve mechanism 131 in its lower position, the same will be caused to move upwardly in the same manner that valve mechanism 129 is caused to move upwardly upon release of the force which holds it in its lower position, and the fluid under pressure within the cylinders of the pistons 101 will be exhausted into the exhaust passage 140 via passages 237 and 246. In order to exhaust any fluid that may leak past the lower portion of valve mechanism 131, the valve body 127 is provided with a passage 247 in communication with a vertically-disposed passage 248 that communicates with the exhaust passage 140'.

Referring to Fig. 4, it is evident that the program drum 193 must be indexed four times before the shoe 197 in alignment with valve mechanism 131 cooperates therewith to move it to its lowest position. During the successive four indexes of the program drum 193, separate and distinct gear combinations will be set up within the transmission. For purposes of clarity, the hand wheels 244 and 245 (Fig. 10) have been set to establish the same gear setting that is effected by the position of the program drum 193 in Fig. 4, and, accordingly, upon the fourth successive index of the drum 193 from the position in which it is shown in Fig. 4, valve mechanism 131 will be moved to its lower position and a gear combination identical with that effected by virtue of the downward movement of the valve mechanisms 129, 132, and 133 will be established. Fig. 10 discloses the apparatus in a position where the valve mechanism 131 is in its lower position with the handwheels 244, 245 set as above described.

Referring to Fig. 5, the valve mechanism 129, etc., were previously described as comprising an upper portion 154 and a lower portion 153. These portions are independently movable such that the lower portion 153 can be moved downwardly against the seat on the upper edge of tubular member 143 independently of the movement of the upper member 154. The upper member 154 is prevented from moving upwardly beyond a fixed point by virtue of the shoulder 154' formed between the abutment portion 163 and the stem portion 154, which shoulder engages the plates 163'.

Referring to Figs. 5 and 11, the valve body 127 is provided with a passage 250 that is adapted to communicate with the passage 128 within which the valve mechanism 129 is adapted to reciprocate. Passage 250 also communicates with the bore 221 within which plug valve 223 is adapted to be oscillated. The boss 225 (Fig. 11) is provided with two radial ports 251 and 252 that are adapted to be moved into alignment with the passage 250. When this occurs, fluid under pressure from the passage 226 is delivered into the bore 128 between the upper and lower portions 154 and 153 of the valve mechanism 129, thereby forcing the lower portion 153 downwardly until it seats on the upper edge of the tubular member 143 and permitting the pressure from inlet 137 to be admitted to the left side of the piston 101 connected with the rod 72, thereby effecting the shifting of element 60 to engage gear 55 to the driven shaft 56 of the transmission. Counter-clockwise movement of the plug valve 223 will align radial passage 252 with passage 250 and likewise cause shifting of element 60 to engage gear 55 with the driven shaft 56 of the transmission. An exhaust passage 251' is provided for each of the bores 128 that receive fluid under pressure for manual manipulation. The passage 251' communicates with an annular chamber 252' formed between the stem 162 and the bore 128 for exhausting any fluid that might leak past the upper portion 154 of the valve mechanism and thereby preventing such fluid from leaking out on top of the plates 163'.

Referring to Fig. 12, the boss 225 shown therein is provided with two radial passages 253 and 254 which upon continued counter-clockwise movement of the plug valve 223 will come into line with a passage 250' parallel with but spaced from passage 250. Passage 250' communicates with the bore 128 within which valve mechanism 129' is adapted to be reciprocated. When passages 253, 254 become aligned with passage 250', fluid under pressure from passage 226 is admitted to the right hand side of the piston 101 connected with the shiftable rod 72 thereby to effect engagement of shiftable element 60 of the transmission with gear 58 thereof. Accordingly, four positions of rotation of the plug valve 223 will provide the selective shifting of the shiftable element 60 to effect its engagement with gears 55 and 58.

Referring to Figs. 6 and 14, the plug valve 223 is provided with a single radial port 255 that is adapted to be turned into alignment with a passage 256 communicating with the bore 128 within which valve mechanism 130 is adapted to be reciprocated. When the radial port 255 is in alignment with the passage 256, fluid under pressure is adapted to move the lower portion of valve mechanism 130 downwardly until it seats upon the tubular member 143 thereby admitting fluid under pressure to the left side of the piston 101 connected to the rod 71 and effecting the movement of element 63 to engage the direct drive between shaft 44 and the driven shaft 56.

Referring to Fig. 16, the plug valve 223 is provided with two additional bosses 225 in which radial ports 257 and 258 are located. The ports 257 and 258 are adapted to cooperate with passage 259 that communicates with the bore 128 within which the valve mechanism 132 is adapted to be reciprocated. In the position shown in Fig. 16, passageway 257 is in alignment with the passage 259 thereby admitting fluid under pressure from the axial bore 226 to the valve mechanism 132 and forcing the lower part of the valve mechanism 132 downwardly to admit fluid under pressure to the left side of the piston 101 that is connected to the rod 70, thereby shifting the element 52 of the transmission into engagement with the gear 51. Similarly, when the radial passage 258 is in alignment with the passage 259, the same condition prevails, namely, shiftable element 52 of the secondary unit Su is shifted into engagement with gear 51.

Referring to Fig. 17, the plug valve 223 is provided with three bosses 225 in which radial passages 260, 261 and 262 are located. These passages are adapted to cooperate with a passage 263 that is formed in the valve body 127 and which communicates with the bore 128 within which the valve mechanism 132' is adapted to reciprocate. When the radial passages 260 and 261 are in alignment with the passage 263, fluid under pressure forces the lower part of valve mechanism 132' downwardly, whereupon fluid under pressure from inlet 137 is admitted to the right side of the piston 101 that is connected to the rod 70 thereby effecting engagement between the shiftable element 52 and the gear 50 within the transmission.

Referring to Figs. 11, 12, 14, 16 and 17, attention is directed to the fact that the radial ports 251 and 257 are aligned with their respective passages 250 and 259 at the same time. Thus, gear 55 is connected to the driven shaft 56 and gear 51 is connected to shaft 49 whereupon the drive from the primary unit Pu passes through the gears 53, 51, 54 and 55 to the driven shaft 56. Furthermore, radial ports 253 and 258 will become aligned with their respective passages 250' and 259 at the same time, in which case gear 58 will be connected to the driven shaft 56 and gear 51 will be connected to shaft 49. In this case the drive from the primary Pu will include gears 53, 51, 57 and 58. Furthermore, radial ports 252 and 260 will become aligned with their respective passages 250 and 263 at the same time. When this occurs, gear 55 will be connected to the driven shaft 56 and gear 50 will be connected to shaft 49. The drive then will be from the primary unit through the gears 46, 50, 54, 55. Additionally, the radial ports 254 and 261 will become aligned with their pasages 250' and 263 at the same time. When this occurs, gear 58 is fixed to the driven shaft 56 and gear 50 is connected to shaft 49. Accordingly, under these circumstances the drive from the primary unit will include gears 46, 50, 57, and 58. From the foregoing it is evident that four positions of the plug valve 223 will provide four separate and distinct gear combinations within the transmission and a fifth combination, namely, the direct drive will be established when the passage 255 (Fig. 14) is aligned with the passage 256 in which case, element 62 is shifted into engagement with the gear 53 thereby directly connecting the driven shaft 56 with the shaft 44. Should the direct drive be established for a great length of time, the driven shaft and the bushing for gear 58 will be subjected to excessive unequal wear tending to make them eccentric. This has been overcome by providing the additional radial port 262 (Fig. 17) which will automatically become aligned with passage 263 at the same time that the radial port 255 (Fig. 14) becomes aligned with its passage 256. Under these circumstances, therefore, the shiftable element 52 will be connected with the gear 50 and consequently, gears 55 and 58 will be rotated thus effecting even wear between the bushing for said gear 58 and the driven shaft 56.

For each of the five possible gear combinations just described, four separate and distinct gear combinations are adapted to be established in the primary unit Pu of the transmission by turning the plug valve 224 to four separate positions. Referring to Fig. 19, the plug valve 224 is provided with a boss 225 having a single radial port 264 that is adapted to be aligned with a passage 265 in communication with the bore 128 of valve body 127 within which valve mechanism 133 is adapted to reciprocate. When the port 264 is in alignment with passage 265, fluid under pressure from bore 226 is admitted to the valve mechanism 133 forcing the lower part thereof downwardly, admitting fluid under pressure to the left side of the piston 101 connected to the rod 68 whereupon shiftable element 43 is connected to gear 41.

Referring to Fig. 20, plug valve 224 is provided with another boss 225 having a radial port 266 that is adapted to be moved into alignment with a passage 267 that communicates with the bore 128 within which the valve mechanism 133' is adapted to reciprocate. When this alignment is provided, the lower portion of valve 133' is moved downwardly and fluid under pressure is admitted to the right side of the piston 101 that is connected to the rod 68 whereupon shiftable element 43 is connected to gear 40 of the transmission.

Referring to Fig. 21, the plug valve 224 is additionally provided with a boss 225 having a radial passage 268 that is adapted to become aligned with a passage 269 that communicates with the bore 128 within which valve mechanism 134 reciprocates. When this alignment occurs, the lower portion of valve 134 is moved downwardly whereupon fluid under pressure is admitted to the left side of the piston 101 that is connected to rod 67 thereby shifting shiftable element 42 into engagement with gear 38.

Referring to Fig. 22, the plug valve 224 is additionally provided with a boss 225 containing a port 270 that is adapted to become aligned with a passage 271 in communication with the bore 128 of the passage within which valve mechanism 134' is adapted to reciprocate. When this alignment occurs, fluid under pressure forces the lower part of valve mechanism 134' downwardly whereupon fluid under pressure is admitted to the right side of the piston 101 that is connected to the rod 67 whereupon shiftable element 42 is connected to gear 39 within the gear transmission.

Referring to Figs. 11, 12, 14, 16, 17, 19, 20, 21, and 22, it is noted that the portions of the plug valves 223 and 224 between the various bosses 225 form exhaust chambers 272 in each instance.

Accordingly, when the various passages 250, 250', 256, 259, 263, 265, 267, 269 and 271 communicate with said chambers 272, the fluid under pressure that maintains the lower portions of the various valve mechanisms in their downward positions is exhausted through passages 238' and 240 thence to the transmission housing. Accordingly, when such condition prevails the lower portions of the various valve mechanisms are caused to be raised by the inlet pressure from the inlet 137 acting on the under faces of the lower portions of said valve mechanisms that are seated on the tubular members 143 (Fig. 5). Upon the upward movement of any of the lower portions of the valve mechanisms, the fluid trapped within the cylinders containing the pistons 101 is exhausted to the transmission housing as previously described.

With the setting of the hand wheels 244 and 245 as just described, a gear combination in the transmission will automatically be set-up when the shoe 197 moves the valve mechanism 131 to its lower position. This gear combination will include a drive from shaft 25 through gears 41, 48, 53, 51, 54 and 55 to the driven shaft 56. Of course, it is to be understood that any of the 20 gear combinations could have been set for being automatically established upon the completion of the series of gear combinations automatically provided by the indexing of the programming drum 193.

As previously described, each new gear combination that is set up by the indexing of the programming drum 193 is accompanied by the timed operation of the clutch 29 and brake 31 (Fig. 9). This timed actuation of the clutch and brake is also effected when the shoe 197 moves the valve mechanism 131 to its lower position to provide the gear combination in the transmission in accordance with the pre-setting of the hand wheels 244 and 245 (Fig. 10). The initial setting of the hand wheels 244 and 245 is performed at the same time the program drum 193 is set up, and the plug valves 223 and 224 are maintained in this set position by means that prevents any accidental displacement thereof during the automatic operation of the machine, and also any manual actuation of hand-wheels 244 and 245 when the main clutch is engaged. Referring to Fig. 10, the ends of the trunnions for the plug valves 223 and 224, within bearings 230 and 232, are provided with notched peripheries 273 and 274 that extend into recessed portions within a closure member 275 fixed to the member 228. Referring to Fig. 23, the end of the trunnion on plug valve 224 is provided with four notches 273 because it is adapted to assume only four positions of rotation; whereas the end of the trunnion for member 223 is provided with five notches 274 because it is adapted to assume five positions of rotation. Spring-pressed detents 276 and 277 are adapted to engage the notches 273, 274. Interference mechanism is provided for fixing the detents 276 and 277 in their active positions comprising a vertically-reciprocable member 278 having notches 279 and 280 which, when in cooperative position relative to the detents 276 and 277, will permit the leftward movement of the latter upon manual rotation of the plug valves 223 and 224; and when said notches 279 and 280 are not in cooperative position with said detents, the member 278 will prevent the leftward movement of said detents and effectively lock the plug valves 223 and 224 in adjusted position. While the valve mechanism 131 is in its lower position the hand wheels 244 and 245 may be adjusted to any desired position to provide any other gear combination within the transmission. Of course, employing the manual means for setting up gear combinations necessitates the manual operation of the clutch 29 and brake 31.

Referring to Fig. 23, a shaft 281 is journaled in a bearing 282 formed on the bearing 194. A spur gear 23 is keyed to the lower end of the shaft 281 in mesh with rack teeth on the one end of a rack bar 284 slidably mounted in a cross-head bearing 285. The end of rack 284 opposite that which meshes with the gear 283 is provided with rack teeth 286 that mesh with the teeth of a gear segment 287 journaled on a sleeve 287' which later is keyed to shaft 208. The teeth of gear segment 287 also mesh with rack teeth 288 on the vertically-reciprocable interference member 278. The sleeve 287' is provided with integral clutch dogs 291 that are adapted to cooperate with dogs 290 on gear segment 287. Lost motion is provided in one direction between the dogs 291 and 290 as clearly shown in Fig. 23. This lost motion permits shaft 208 to be moved in a clockwise direction an amount equal to the lost motion without affecting gear segment 287. Thus, the actuation of shaft 208 by the rotation of disc 205 (Fig. 9) is independent of shaft 281, although movement of shaft 281 from left to right (Fig. 23) will cause the dogs 290 to move the shaft 208 through dogs 291. Upon movement of shaft 281 from right to left, the pressure acting on valve mechanism 136 will force shaft 208 in a counterclockwise direction, thereby maintaining dogs 290 and 291 in abutting relation. Furthermore, oscillation of the shaft 281 will effect reciprocable movement of the interference member 278. The construction and arrangement of the parts are such that in the position shown in Fig. 23, the brake 31 is disengaged and the clutch 29 is in engagement, and the detents 276 and 277 lock the plug valves 223 and 224 in their adjusted positions. It is clear that successive actuations of the clutch and brake by disc 205 will not release detents 276 and 277. Therefore, the handwheels 244, 245 can only be adjusted upon manually moving shaft 281 from left to right (Fig. 23). Turning shaft 281 from left to right (Fig. 23), will cause shaft 208 to turn thereby forcing rocker arm 209 (Fig. 7) downwardly and causing the intermittent admission and cut-off of fluid under pressure to the right side of piston 117 moving the latter towards the left and thereby effecting disengagement of the clutch 29 and engagement of the brake 31. While this is occuring, notches 279 and 280 (Fig. 23) become aligned with the detents 276 and 277 whereupon the plug valves 223 and 224 may be manually turned by the handles 245 and 244 to provide any desired gear combination within the transmission. When a desired gear combination has been established, turning of the shaft 281 from right to left (Fig. 23) permits upward movement of the rocker arm 209 (Fig. 7) to thereby effect the intermittent admission and cut-off of fluid under pressure to the left side of piston member 123 to thereby incrementally shift the plunger 117 to the right, effecting disengagement of the brake 31 and engagement of the clutch 29. At the same time, the notches 279 and 280 move out of registry with the detents 276 and 277 and maintain the plug valves 223 and 224 in their adjusted position. As previously explained, in connection with the description of the compound valve actuating mechanism 136 shown in Fig. 7, the incremental movement of the clutch 29 into driving engagement is directly proportional to the incremental movement applied to shaft 281. Accordingly, an hydraulically-operated clutch is provided that does not completely become engaged when the pressure is turned on, but one which moves toward or from engagement by increments proportional to the movements applied to the manual actuating mechanism. Such a clutch in a transmission is extremely valuable since it places the incremental rotary movement of the driven member directly under the control of the operator.

Although the various features of the improved transmission control have been shown and described in detail to fully disclose one embodiment of the invention, it is evident that numerous changes may be made in such details, and certain features may be used without others, without departing from the principles of the invention.

We claim:

1. A transmission comprising in combination, a driving member; a driven member; a plurality of gears between said driving and driven members; a clutch; means adapted to be operated for establishing various gear combinations between said driving and driven members; a control drum adapted successively to be indexed from point to point about its periphery and including means at each of said points for attaching replaceable elements for operating any of said gear-combination establishing means, whereby at each point of said drum any of said gear-combinations may be operated; and a power-operated control adapted to perform successive cycles of operation, said control including a member adapted to make a complete revolution for each of said cycles and adapted during each cycle successively to neutralize said clutch, to move said control drum from one point to its next succeeding point, and to engage said clutch.

2. A transmission comprising in combination, a driving member; a driven member; a plurality of gears between said driving and driven members; a clutch; a plurality of elements adapted to be operated in groups of certain of said elements, for establishing various gear combinations between said driving and driven members; a control drum adapted successively to be indexed from point to point about its periphery and including means at each of said points for attaching replaceable elements for operating any of said gear-combination establishing elements, whereby at each point of said drum any of said gear-combinations may be operated; and a power-operated control adapted to perform successive cycles of operation, said control including a member adapted to make a complete revolution for each of said cycles and adapted during each cycle of operation successively to neutralize said clutch, to move said control drum from one point to its next succeeding point and to engage said clutch.

3. A transmission comprising in combination, a driving member; a driven member; a plurality of gears between said driving and driven members; a clutch; fluid-actuated means adapted to be operated for establishing various gear combinations between said driving and driven members; a control drum adapted successively to be indexed from point to point about its periphery and including means at each of said points for attaching replaceable elements for operating any of said fluid-actuated means, whereby at each point of said drum any of said gear-combinations may be operated; and a power-operated control adapted to perform successive cycles of operation, said control including a member adapted to make a complete revolution for each of said cycles and adapted during each cycle of operation successively to neutralize said clutch, to move said control drum from one point to its next succeeding point, and to engage said clutch.

4. A transmission comprising in combination, a driving member; a driven member; a plurality of gears between said driving and driven members; a clutch; a brake; means adapted to be operated for establishing various gear combinations between said driving and driven members; a control drum adapted successively to be indexed from point to point about its periphery and including means at each of said points for attaching replaceable elements for operating any of said gear-combination establishing means, whereby at each point of said drum any of said gear-combinations may be operated; and a power-operated control adapted to perform successive cycles of operation, said control including a member adapted to make a complete revolution for each of said cycles and adapted during each cycle of operation successively to neutralize said clutch and engage said brake, to move said control drum from one point to its next succeeding point at a substantial time interval after said brake is engaged, and to disengage said brake and engage said clutch.

5. A transmission comprising in combination, a driving member; a driven member; a plurality of gears between said driving and driven members; a clutch; a brake; a plurality of elements adapted to be operated in groups of certain of said elements, for establishing various gear combinations between said driving and driven members; a control drum adapted successively to be indexed from point to point about its periphery and including means at each of said points for attaching replaceable elements for operating any of said gear-combination establishing elements, whereby at each point of said drum any of said gear-combinations may be operated; and a power-operated control adapted to perform successive cycles of operation, said control including a member adapted to make a complete revolution for each of said cycles and adapted during each cycle of operation successively to neutralize said clutch and engage said brake, to move said control drum from one point to its next succeeding point at a substantial time interval after said brake is engaged, and to disengage said brake and engage said clutch.

6. A transmission comprising in combination, a driving member; a driven member; a plurality of gears between said driving and driven members; a clutch; a brake; fluid-actuated means adapted to be operated for establishing various gear combination between said driving and driven members; a control drum adapted successively to be indexed from point to point about its periphery and including means at each of said points for attaching replaceable elements for operating any of said fluid-actuated means, whereby at each point of said drum any of said gear-combinations may be operated and a power-operated control adapted to perform successive cycles of operation, said control including a member adapted to make a complete revolution for each of said cycles and adapted during each cycle of operation successively to neutralize said clutch and engage said brake, to move said control drum from one point to its next succeeding point at a substantial time interval after said brake is engaged, and to disengage said brake and to engage said clutch.

7. A transmission comprising in combination, a driving member; a driven member; a plurality of gears between said driving and driven members; a clutch; means adapted to be operated for establishing preselected gear combinations between said driving and driven members; a control adapted to perform successive cycles of operation, said control including means adapted during each cycle of operation successively to neutralize said clutch, to operate preselected of said gear-combination establishing means, and to engage said clutch; manually-operable means for shifting said clutch; and manual means for rendering effective any one of said gear combinations without disturbing the setting of said control.

8. A transmission comprising in combination, a driving member; a driven member; a plurality of gears between said driving and driven members; a clutch; means adapted to be operated for establishing various gear combinations between said driving and driven members, a control adapted to perform successive cycles of operation, said control including means adapted during each cycle of operation successively to neutralize said clutch, to index a member adapted to operate any one of said gear-combination establishing means, and to engage said clutch; manually-operable means for shifting said clutch independently of said control; and manual means for rendering effective any of said gear combinations without disturbing the setting of said control.

9. A transmission comprising in combination, a driving member; a driven member; a plurality of gears between said driving and driven members; a clutch; a brake; means adapted to be operated for establishing various gear combinations between said driving and driven members; a power-operated control adapted to perform successive cycles of operation, said control including means adapted during each cycle of operation successively to neutralize said clutch and apply said brake, to operate any one of said gear-combination establishing means, and to release said brake and engage said clutch; manually-operable means for shifting said clutch; and manual means for operating any one of said gear-combination establishing means without disturbing the setting of said control.

10. A transmission comprising in combination, a driving member; a driven member; a plurality of gears between said driving and driven members; a clutch; fluid-actuated means adapted to be operated for establishing various gear combinations between said driving and driven members; a control adapted to perform successive cycles of operation, said control including means adapted during each cycle of operation successively to neutralize said clutch, to operate any one of said fluid-actuated gear-combination establishing means, and to engage said clutch; manually-operable means for shifting said clutch; and manual means for rendering effective any of said gear combinations without disturbing the setting of said control.

11. A transmission comprising in combination, a driving member; a driven member; a plurality of gears between said driving and driven members; a clutch; a brake; fluid-actuated means adapted to be operated for establishing various gear combinations between said driving and driven members; a power-operated control adapted to perform successive cycles of operation, said control including means adapted during each cycle of operation successively to neutralize said clutch and apply said brake, to operate any one of said gear-combination establishing means, and to release said brake and engage said clutch; manually-operable means for shifting said clutch; and manually-operable means for operating any one of said gear-combination establishing means without disturbing the setting of said control.

12. A transmission comprising in combination, a driving member; a driven member; a plurality of gears between said driving and driven members; a clutch; means adapted to be operated for establishing various gear combinations between said driving and driven members; a control adapted to perform successive cycles of operation, said control including means adapted during each cycle of operation successively to neutralize said clutch, to operate any one of said gear-combination establishing means, and to engage said clutch; fluid-actuated manually-operable means for shifting said clutch; and manually-operable means for operating any one of said gear-combination establishing means without disturbing the setting of said control.

13. A transmission comprising in combination, a driving member; a driven member; a plurality of gears between said driving and driven members; a clutch; a brake; means adapted to be operated for establishing various gear combinations between said driving and driven members; a power-operated control adapted to perform successive cycles of operation, said control including means adapted during each cycle of operation successively to neutralize said clutch and apply said brake, to operate any one of said gear-combination establishing means, and to release said brake and engage said clutch; fluid-actuated manually-operable means for shifting said clutch; and manually-operable means for operating any one of said gear-combination establishing means without disturbing the setting of said control.

14. A transmission comprising in combination, a driving member; a driven member; a plurality of gears between said driving and driven members; means adapted to be operated for establishing various gear combinations between said driving and driven members; a control drum adapted successively to be indexed from point to point about its periphery and including means at each of said points for attaching replaceable elements for operating any of said gear-combination establishing means, whereby at each point of said drum any of said gear-combinations may be operated; a control adapted to perform successive cycles of operation including a member adapted to make a complete revolution for each of said cycles; manual means for operating any of said gear-combination establishing means without disturbing the setting of said replaceable elements on said control drum, said manual means being normally ineffective during the successive cycles of operation of said control and means adapted to be operated by said control drum for rendering effective said manually-operable means.

15. A transmission comprising in combination, a driving member; a driven member; a plurality of gears between said driving and driven members; a clutch; means adapted to be operated for establishing various gear combinations between said driving and driven members; a control adapted to perform successive cycles of operation, said control including means adapted during each cycle of operation successively to neutralize said clutch, to operate any one of said gear-combination establishing means, and to engage said clutch; manually-operable means for shifting said clutch; manually-operable means for operating any one of said gear-combination establishing means without disturbing the setting of said control; and means for preventing the operation of said last mentioned manually-operable means when said clutch is engaged.

16. A transmission comprising in combination, a driving member; a driven member; a plurality of gears between said driving and driven members; a clutch; means adapted to be operated for establishing various gear combinations between said driving and driven members; a piston connected to each of said gear-combination establishing means; cylinders for said pistons; a valve body including valves for controlling the flow of fluid to said cylinders; means adapted to be indexed from position to position to render effective successive portions thereof that are selectively adapted to be set to actuate any of said valves; and a control adapted to perform successive cycles of operation in each of which said clutch is neutralized, said means is indexed and said clutch is engaged.

17. A transmission comprising in combination, a driving member; a driven member; a plurality of gears between said driving and driven members; a clutch; means adapted to be operated for establishing various gear combinations between said driving and driven members; a piston connected to each of said gear-combination establishing means; cylinders for said piston; a valve body including valves for controlling the flow of fluid to said cylinders; means adapted to be indexed from position to position to render effective successive portions thereof that are selectively adapted to be set to actuate any of said valves; and a control including a member adapted to make a single revolution for each of successive cycles of operation, said control member including means adapted successively to effect neutralization of said clutch, indexing of said means and engagement of said clutch.

18. A transmission comprising in combination, a driving member; a driven member; a plurality of gears between said driving and driven members; a clutch; means adapted to be operated for establishing various gear combinations between said driving and driven members; piston means for each of said gear-combination establishing means; cylinders for said piston means; means acting on said piston means normally holding said gear-combination establishing means in neutral; a valve body including valves for controlling the flow of fluid to said cylinders, said fluid being adapted to overcome said neutralizing means; means adapted to be indexed from position to position to render effective successive portions thereof that are selectively adapted to be set to actuate any of said valves; and a control adapted to perform successive cycles of operation in each of which said clutch is neutralized, said means is indexed and said clutch is engaged.

19. A transmission comprising in combination, a driving member; a driven member; a plurality of gears between said driving and driven members; a clutch; means adapted to be operated for establishing various gear combinations between said driving and driven members; a piston connected to each of said gear-combination establishing means; cylinders for said pistons; a valve body including valves for controlling the flow of fluid to said cylinders; and a control adapted to perform successive cycles of operation in each of which said clutch is neutralized, certain of said valves are operated and said clutch is engaged.

20. A transmission comprising in combination, a driving member; a driven member; a plurality of gears between said driving and driven members; a clutch; a brake; means adapted to be operated for establishing various gear combinations between said driving and driven members; a piston connected to each of said gear-combination establishing means; cylinders for said pistons; a valve body including valves for controlling the flow of fluid to said cylinders; means adapted to be indexed from position to position to render effective successive portions thereof that are selectively adapted to be set to actuate any of said valves; and a control adapted to perform successive cycles of operation, said control including means adapted during each cycle of operation successively to neutralize said clutch and engage said brake, to index said means at a substantial time interval after said brake is engaged, and to disengage said brake and engage said clutch.

21. A transmission comprising in combination, a driving member; a driven member; a plurality of gears between said driving and driven members; a clutch; means adapted to be operated for establishing various gear combinations between said driving and driven members; a piston connected to each of said gear-combination establishing means; cylinders for said pistons; a valve body including valves for controlling the flow of fluid to said cylinders; means adapted to be indexed from position to position to render effective successive portions thereof that are selectively adapted to be set to actuate any of said valves; a control adapted to perform successive cycles of operation, in each cycle of which said means is indexed; and manual means including means adapted to cooperate with said valves for rendering effective any of said gear combinations independently of the setting of the successive portions of said indexable means.

22. A transmission comprising in combination, a driving member; a driven member; a plurality of gears between said driving and driven members; a clutch; means adapted to be operated for establishing various gear combinations between said driving and driven members; a piston connected to each of said gear-combination establishing means; cylinders for said piston; a valve body including valves for controlling the flow of fluid to said cylinders; means adapted to be indexed from position to position to render effective successive portions thereof that are selectively adapted to be set to actuate any of said valves; a control adapted to perform successive cycles of operation, in each cycle of which said means is indexed; and rotatable valve means for controlling the flow of fluid to the valves in said valve body for actuating them independently of the successive portions of said indexable means.

23. A transmission comprising in combination, a driving member; a driven member; a plurality of gears between said driving and driven members; means adapted to be operated for establishing various gear combinations between said driving and driven members; a control drum adapted successively to be indexed from point to point about its periphery and including means at each of said points for attaching replaceable elements for operating any of said gear-combination establishing means, whereby at each point of said drum any of said gear-combination establishing means may be operated; a control adapted to perform successive cycles of operation, in each cycle of which said drum is indexed from one point to its next succeeding point; manually-operable means for selecting any of said gear combinations without affecting the setting of said replaceable elements on said control drums; and means adapted to be operated for rendering said manually-selective means effective and said control drum ineffective.

24. A transmission comprising in combination, a driving member; a driven member; a plurality of gears between said driving and driven members; fluid-actuated means adapted to be operated for establishing various gear combinations between said driving and driven members; a control drum adapted successively to be indexed from point to point about its periphery and including means at each of said points for attaching replaceable elements for operating any of said fluid-actuated means, whereby at each point of said drum any of said gear-combination establishing means may be operated; a control adapted to perform successive cycles of operation, in each cycle of which said drum is indexed from one point to its next succeeding point; manually-operable means for selecting any of said gear combinations without affecting the setting of said replaceable elements on said drum; and means adapted to be operated for rendering said manually-selective means effective and said control drum ineffective.

EDWARD P. BULLARD, III.
EDWARD N. COWELL.

REFERENCES CITED

The following references are of record in the file of this patent:

UNITED STATES PATENTS

| Number | Name | Date |
| --- | --- | --- |
| 1,363,751 | Potter | Dec. 28, 1920 |
| 1,668,319 | Kennedy | May 1, 1928 |
| 1,828,423 | Loeffler | Oct. 20, 1931 |
| 1,844,631 | Bragg et al. | Feb. 9, 1932 |
| 1,911,599 | Bloxsom | May 30, 1933 |
| 1,975,626 | Tibbetts | Oct. 2, 1934 |
| 1,993,544 | Fleischel | Mar. 5, 1935 |
| 2,002,315 | Furgason | May 21, 1935 |
| 2,005,822 | Burrell | June 25, 1935 |
| 2,018,977 | Spellman et al. | Oct. 29, 1935 |
| 2,030,838 | Hill et al. | Feb. 11, 1936 |
| 2,050,520 | Carter | Aug. 11, 1936 |
| 2,062,523 | Miller | Dec. 1, 1936 |
| 2,081,238 | Kelley | May 21, 1937 |
| 2,134,576 | Price et al. | Oct. 25, 1938 |
| 2,137,222 | Barr | Nov. 22, 1938 |
| 2,140,758 | McWade et al. | Dec. 20, 1938 |
| 2,150,408 | Weibrecht | Mar. 14, 1939 |
| 2,169,216 | Bloxsom | Aug. 15, 1939 |
| 2,174,292 | Rich | Sept. 26, 1939 |
| 2,181,532 | Hill et al. | Nov. 28, 1939 |
| 2,218,136 | Price | Oct. 15, 1940 |
| 2,255,739 | Curtis | Sept. 9, 1941 |
| 2,266,598 | Hale | Dec. 16, 1941 |

Certificate of Correction

Patent No. 2,466,574. April 5, 1949.

EDWARD P. BULLARD, III, ET AL.

It is hereby certified that errors appear in the printed specification of the above numbered patent requiring correction as follows:

Column 11, line 2, for "plunger member 23" read *plunger member 123*; column 20, line 31, for "spur gear 23" read *spur gear 283*; line 38, for "sleeve 287" read *sleeve 287'*; column 22, line 11, after "point" insert a comma; column 23, line 17, after the words "be operated" insert a semi-colon; column 26, line 74, for "piston" read *pistons*; column 27, line 28, for "drums" read *drum*;

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*